(12) United States Patent
Nair

(10) Patent No.: US 12,204,451 B2
(45) Date of Patent: *Jan. 21, 2025

(54) METHOD AND SYSTEM FOR STORAGE VIRTUALIZATION

(71) Applicant: Dynavisor, Inc., Milpitas, CA (US)

(72) Inventor: Sreekumar Nair, San Jose, CA (US)

(73) Assignee: Dynavisor, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/454,707

(22) Filed: Aug. 23, 2023

(65) Prior Publication Data

US 2023/0393982 A1    Dec. 7, 2023

Related U.S. Application Data

(63) Continuation of application No. 17/144,612, filed on Jan. 8, 2021, now Pat. No. 11,775,432, which is a continuation of application No. 16/057,689, filed on Aug. 7, 2018, now Pat. No. 10,896,129.

(60) Provisional application No. 62/542,213, filed on Aug. 7, 2017.

(51) Int. Cl.
| | |
|---|---|
| *G06F 12/0811* | (2016.01) |
| *G06F 9/4401* | (2018.01) |
| *G06F 9/455* | (2018.01) |
| *G06F 12/0815* | (2016.01) |
| *G06F 12/0897* | (2016.01) |
| *G06F 16/174* | (2019.01) |

(52) U.S. Cl.
CPC ......... *G06F 12/0811* (2013.01); *G06F 9/441* (2013.01); *G06F 9/45533* (2013.01); *G06F 9/45558* (2013.01); *G06F 12/0815* (2013.01); *G06F 12/0897* (2013.01); *G06F 16/1748* (2019.01); *G06F 2009/45579* (2013.01); *G06F 2009/45583* (2013.01); *G06F 2212/284* (2013.01)

(58) Field of Classification Search
CPC ............ G06F 12/0811; G06F 12/0815; G06F 12/0897; G06F 16/1748; G06F 2009/45579; G06F 2009/45583; G06F 2212/284; G06F 9/441; G06F 9/45533; G06F 9/45558
USPC ....................................................... 711/122
See application file for complete search history.

(56) References Cited

U.S. PATENT DOCUMENTS

| | | | | |
|---|---|---|---|---|
| 2016/0054933 A1* | 2/2016 | Haghighi | ............ | G06F 12/0638 711/103 |
| 2017/0235507 A1* | 8/2017 | Sinha | .................. | G06F 11/2069 711/114 |
| 2018/0069944 A1* | 3/2018 | Yang | .................. | H04L 43/0852 |

* cited by examiner

*Primary Examiner* — Hashem Farrokh
(74) *Attorney, Agent, or Firm* — Goodwin Procter LLP

(57) ABSTRACT

A system and method for providing storage virtualization (SV) is disclosed. According to one embodiment, a system includes a storage device having a tier 1 cache and a Tier 2 storage, an operating system and a file system having a Tier 0 memory cache that stores application data. The Tier 0 memory cache synchronizes the application data with the tier 1 cache and the Tier 2 storage.

20 Claims, 18 Drawing Sheets

METHOD AND SYSTEM FOR STORAGE VIRTUALIZATION

This application is a continuation of U.S. application Ser. No. 17/144,612, filed Jan. 8, 2021, which is a continuation of U.S. application Ser. No. 16/057,689, filed Aug. 7, 2018, which claims the benefit of and priority to U.S. Provisional Patent Application Ser. No. 62/542,213 filed on Aug. 7, 2017 and entitled "DYNAMIC STORAGE VIRTUALIZATION," which is hereby incorporated by reference.

FIELD

The present disclosure relates in general to the field of computer software and systems, and in particular, to a system and method for dynamic information virtualization.

BACKGROUND

Information is at the heart of computer applications. Information refers to data emanating from various sources including storage devices, Web resources, application data, instant messages, emails, dynamic objects, etc. Enterprise information virtualization (EIV) allows applications to abstract information (e.g., virtualization provides an abstract view of any physical or concrete entity) from a variety of sources and consume in a seamless manner. An EIV server evaluates requests for information from an information requestor, optimizes and sends queries for the requested information to individual data sources, and delivers and reports query results to the information requestor. The EIV server may also run a custom application and publish the query results on a Web service.

Coherency of information is important when caching information to achieve good performance. Management of information coherency is in many ways akin to cache coherency management in processors. The underlying coherency management for either information management or cache coherency management should account for the followings. First, the unit of coherency is pre-determined. The unit of coherency is usually a block of a convenient size (e.g., one memory page). When multiple computers or applications cache the same information, the coherency protocol ensures that a block of information can at most be modified by one process or one computer at a time. Second, when a process (or computer) intends to write to a block, the process (or computer) first acquires a lock, reads the latest version of the information block from a backing store, and notifies all other processes (or computers) to invalidate the block from their caches. In cache coherency protocols, this process is referred to as read for ownership (RFO). An example of cache coherency protocols is MESI protocol. As long as a process (or computer) holds a RFO lock on a block, the process (or computer) is allowed to write to the block (also referred to as dirty writes). Subsequently, when another process (or computer) requests to read the same block, a cache manager requests the process (or computer) that holds the RFO lock to flush the block to the backing store, and release the RFO lock. Then, the cache manager enables the requesting process to acquire the RFO lock, and cache the block of information for its use. With most processor caches, data is fetched into a cache before the requestor can consume it. In storage caching it is very common that only hot data resides in a cache. All other accesses go directly to the backing store.

SUMMARY

A system and method for providing storage virtualization (SV) is disclosed. According to one embodiment, a system includes a storage device having a tier 1 cache and a tier 2 storage, an operating system and a file system having a Tier 0 memory cache that stores application data, wherein the Tier 0 memory cache synchronizes the application data with the tier 1 cache and a tier 2 storage.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying figures, which are included as part of the present specification, illustrate the various embodiments of the presently disclosed system and method and together with the general description given above and the detailed description of the embodiments given below serve to explain and teach the principles of the present system and method.

Figure 1:
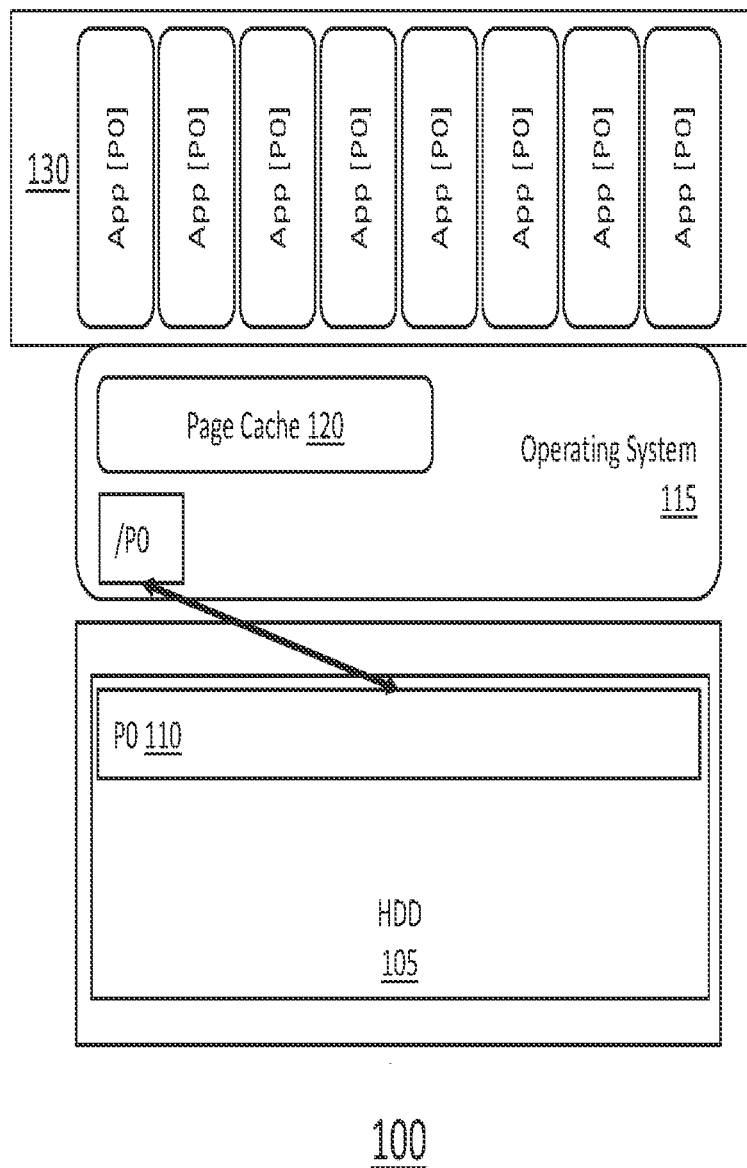
FIG. 1 illustrates a prior architecture of an application that operates on data mounted from a HDD partition P0 onto a directory/P0 of operating system.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

A system and method for providing storage virtualization (SV) is disclosed. According to one embodiment, a system includes a storage device having a tier 1 cache and a tier 2 storage, an operating system and a file system having a Tier 0 memory cache that stores application data, wherein the Tier 0 memory cache synchronizes the application data with the tier 1 cache and a tier 2 storage.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

The present system is a high efficiency dynamic storage virtualization (SV) device architecture, named SV disk. SV disk presents itself as a logical storage device (e.g., a disk or device) on the compute nodes (server side storage virtualization).

SV disks on multiple compute nodes form a peer-to-peer cluster (serverless) and control the attributes of storage operations initiated by applications on the compute nodes.

SV disks keep track of the frequency of access to each file block (data access history) and decide which blocks need to be in Tier 0, 1, and 2 of the storage hierarchy. SV disks control how data is filled and evicted in Tier 0 and 1 caches. SV disks also make the determination about when to writeback the data to T1 cache and T2 storage (especially in a power aware manner controlled by time budgets of the battery of UPS lifetime) and also control coherency of data—suppose one compute node attempts to write to a data block that is presently shared read-only among multiple compute nodes, SV disk detects this write request and ensures all the other compute nodes invalidate their cached copies of the data block before letting the originator of the write operation to complete the write operation. SV disk coherence management mechanism also controls two major functionality named transactional storage semantics, and real time or near real time disaster recovery.

SV disks build and maintain soft (logical) partitions for segregating data from different organizations, users, or applications—unlike hard (physical) partitions enforced by drivers of normal storage devices. In SV disks, data resides in a single pool and the SV disks maintain the indices of metadata and data blocks that are logically grouped together to form a soft partition.

SV disk drivers break down single control or data plane operations into multiple parallel operations and send them over multiple parallel internal I/O channels to the SV Disks—for example if an application makes a request to read 128 KB data blocks, the SV disk driver could break it down into 32 read operations of 4 KB each and send the requests to the SV disk across 32 different channels.

SV disk controls the (optional) transparent offline deduplication of data in T2 storage at a file or block level (also can be within a single server or across the entire data center). SV disks also control the data replication across multiple physical storage devices and multiple physical servers (based on user configuration) to achieve the appropriate levels of high availability required by diverse applications. Normally disk partitioning is a software controlled phenomenon implemented in disk drivers. In the present SV system the partitions are built and maintained by the SV disk and may be implemented in hardware, firmware, or software (like drivers or applications).

SV disks have the following functions:
1) Tier 0 (T0) coherent volatile in-memory cache of hot data shared across multiple compute nodes (multiple physical or virtual computers potentially running different operating systems)
2) Tier 1 (T1) coherent non-volatile persistent inclusive cache of hot data on a storage device, such as HDD, SSD, or NVMe.
3) Tier 2 (T2) non-volatile persistent storage in multiple storage formats including but not restricted to:
    Filesystems: Local direct attached storage devices (DAS) with filesystems like ext4, ntfs, fat, etc. or network attached storage devices (NAS) with distributed filesystems including NFS, Samba, Lustre, Gluster, etc.
    Block devices: Local block devices (disk partitions) or networked block devices offered by storage area network (SAN), Ceph RBD, iSCSI, etc.
    Object stores: Like Amazon S3, Openstack Swift, Ceph RADOS, etc.
    Distributed data stores: Like Hadoop distributed file system (HDFS), Cassandra, etc.
Optional Tier 2 (T2) deduplicated store shared across multiple T2 storage devices, where deduplication can happen at block level or file level. Deduplication may be offline or online (in-motion). Deduplication can be node level, cluster level, or centralized at a data center level (which offers the highest probability to detect duplicates).

SV disk controlled partitions presented to the operating system and applications on the compute node in multiple forms depending on the Tier 2 storage type used—including but not restricted to:

File System
Block Device
Connector for Object Stores
Connector for Distributed Data Stores The present system provides a SV disk controlled fast parallel internal I/O channels for parallelizing control and data plane storage operations to significantly minimize latency and maximize throughput.

The present system provides a SV disk controlled, multi-tiered, distributed, power aware, deduplicated, secure, multi-writer, server side in-memory caching of hot data.

The present system provides a SV disk controlled data coherency—memory manager to (a) fill and evict cache, (b) manage memory page assignments to cached data, (c) manage transactional storage semantics, and (d) real time or near real time disaster recovery.

The present system provides a SV disk controlled storage high availability and data replication across multiple physical storage devices and multiple physical servers.

The present system provides a SV disk controlled in-motion or offline deduplication at block or file level, and consequent higher capacity resulting from more compact data representation—where the deduplication may happen at a node or cluster level or centralized at a whole data-center level.

SV Disk provides significant advantages over classical storage acceleration methods as described below.

FIG. 1 illustrates a prior architecture 100 of an application 130 that operates on data mounted from a HDD partition P0 110 onto a directory/P0 under the control of operating system 115. The operating system's pagecache 120 uses unused memory on the system to buffer file blocks to improve storage performance. Typical pagecache architectures like the one on a Linux operating system, use a writeback cache with a least recently used (LRU) replacement algorithm. Compared with a Linux like pagecache, the present storage virtualization system employs significantly higher performing algorithms like the ability to control writeback at finer granularity, timing writebacks to stay within power budgets as decided by the lifetime of battery and UPS, compacting the contents of multiple small files into the same memory pages, etc. While pagecache is local to an operating system and perishes at a system shutdown, the present storage virtualization system provides in-memory caches that persist across reboots and are shared across physical computers, and across multiple types of operating systems (e.g., across Windows and Linux), and across multiple virtual machines. In one embodiment, the present system improves upon the prior art because the present storage virtualization system performs simultaneous single-writer/multi-reader storage operations on shared caches across physical computers, and multi-writer/multi-reader storage operations on shared caches across virtual machines on the same physical computer. In another embodiment, the present system uses a delegate mechanism to manage data and permit multi-reader/multi-writer storage operations across multiple physical and virtual computer nodes, wherein the delegate has exclusive control over all cached data for a block, file, or partition. The present system improves upon the prior art because with the present storage virtualization system, metadata and data of in-memory cache are persisted across reboots—so virtual machines can startup at the same state as before and continue reaping the same performance benefits as before the reboot. Pagecache does not persist across reboots and hence data needs to warm up in the cache (which could take hours, days, or weeks). In contrast, the present system improves upon the prior art because in the case of the present storage virtualization system a memory manager ensures that each file block is mapped on a unique physical memory page and shared across guest operating systems running on a hypervisor in a physical computer. The present storage virtualization system achieves deduplication of memory (or page sharing), by virtue of deduplicated storage, at zero additional run-time expense of compute or memory resources.

Storage operations can generally be classified into two—control and data plane operations. To illustrate this in the context of a filesystem, control plane operations include operations on directories and files (like checking for existence of files/directories, creation and deletion of files/directories, opening and closing of files for storage operations, etc.) while data plane operations include the actual reads and writes onto the file contents. Data plane operations are more bandwidth intensive than control plane operations. SV disk maintains the list of network interfaces (NICs) on the compute nodes that can be used to perform network operations to other devices and it also records the relative speeds of these network interfaces (e.g., a 1 Gbps NIC will be designated speed 0, a 10 Gbps NIC will be designated speed 1, a 25 Gbps NIC will be designated Speed 2, a 100 Gbps NIC will be designated Speed 3, etc.). The present system improves upon the prior art because the present storage virtualization system considers the relative speeds of different network interfaces on each computer to efficiently route control plane operations to lower bandwidth interfaces and data plane operations to higher bandwidth interfaces.

Figure 2:
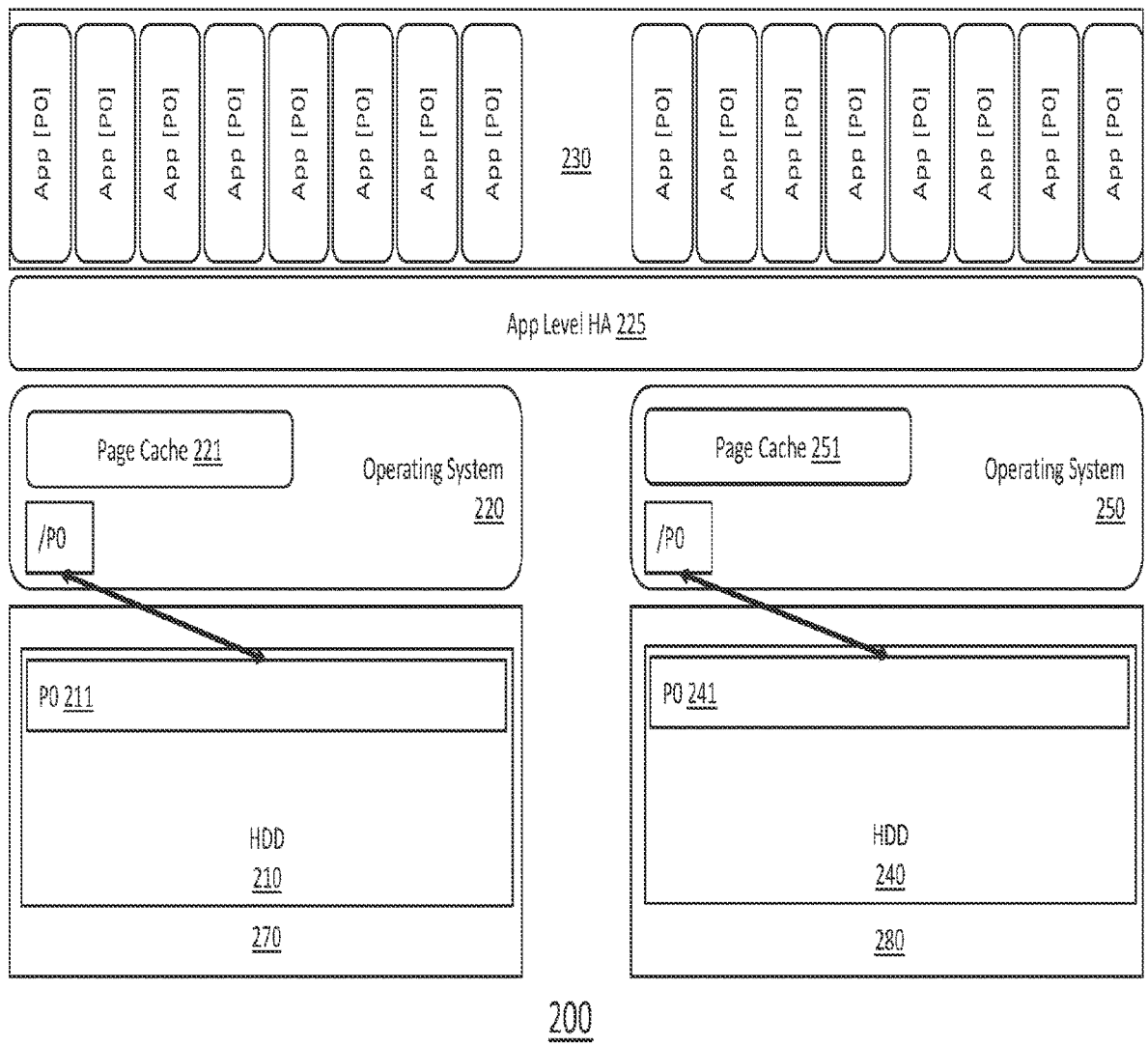
FIG. 2 illustrates an exemplary prior High Availability (HA) architecture similar to Oracle RAC (Real Application Cluster).

FIG. 2 illustrates an exemplary prior High Availability (HA) architecture 200 similar to Oracle RAC (Real Application Cluster). The same applications 230 are run in active/passive or active/active modes on multiple compute nodes 270 and 280. Compute as well as storage is vertically replicated for redundancy. An application 230 operates on data mounted from a HDD partition P0 111 onto a directory/P0 of operating system 220. A second instance of the application 230 operates on data mounted from a HDD partition P0 141 onto a directory/P0 of operating system 250. The operating system's pagecaches 221 and 251 use unused memory on the system to buffer file blocks to improve storage performance. The application level high availability tier (225) running on each compute node in a cluster frequently exchange heartbeats (or handshakes) to confirm to each other they are alive. In an active/passive cluster, if the active node goes down, the other (passive) nodes fail to receive the heartbeats (or handshakes) and the remaining nodes vote amongst themselves and arrive at a determination about which node should take control over the application.

VMware supports a feature called Transparent Page Sharing (TPS) where identical pages are shared across virtual machines on the same hypervisor—mainly benefiting sharing of kernel code pages. This is made possible by virtue of a deduplication algorithm that pertains only to the hypervisor—which is memory and compute intensive on the hypervisor. In contrast, the present system improves upon the prior art because the present storage virtualization system relies on a centralized data center wide offline deduplication to ensure page sharing where there is zero compute and memory overhead on the hypervisor.

Data deduplication occurs online or offline. If every data write operation is filtered by a deduplication engine to look for duplicates, then it is called online deduplication—this is compute intensive as well as time/memory intensive and can slow down the compute or storage nodes significantly as well as add latency to the storage operation. According to one embodiment, with the present system write operations are not deduplicated online—but when the compute or storage nodes are idle, a deduplication manager in the storage virtualization system scans the T2 storage for blocks that are yet to be deduplicated and sends them to a deduplication server. If a duplicate is found, the block is replaced with a pointer to the deduplicated block. Offline deduplication accomplishes the goal of data compression without the compute/memory/time overheads of online deduplication.

Cache only memory architecture (COMA) is a computer memory architecture where data resides only in the caches—data is created in cache, consumed from cache, and deleted from cache when the data is not needed anymore. DSV introduces a "no-write" mode which is an application of cache only memory architecture in the domain of storage.

The present storage virtualization disk is an abstract (e.g., implemented in multiple ways—in hardware, in a software driver, in a filesystem, etc.) storage device that facilitates 10-100× lower latency and 10-100× higher throughput for storage operations compared with contemporary storage devices. The speed-up is due to in-memory caching of hot data and massive parallelization of storage operations. Also coupled with performance, the present storage virtualization system delivers automatic tiering of storage exploiting memory and flash devices (SSD, NVMe) for storage of hot data, storage level high availability with 2-8× data replication, 10-100× data compaction via in-motion or offline deduplication, etc. According to one embodiment, in-motion deduplication is online deduplication when every write operation goes through a deduplication engine to check for duplicates.

The present storage virtualization system can be embodied in multiple hardware, software, and hybrid (combined hardware and software) implementations. When implemented in hardware the present storage virtualization disk may be implemented in numerous ways including but not restricted to a PCI Express card, a QPI/Hypertransport module, etc. When implemented in software it may be implemented in numerous forms including but not restricted to the present storage virtualization system disk driver that provides the backing store for multiple storage interfaces like a filesystem (SV FS), a block device (SV BD) or connectors to object stores and distributed data stores. For the sake of simplicity, this disclosure explains the present storage virtualization system disk architecture implemented in two forms—two hardware implementation as PCIe cards, and a software implementation based on a file system (SV FS). But the concepts presented herein easily map to other manifestations, some of which are discussed above. Similarly, the illustrations below assume software modules implemented in an operating system's kernel—but the software modules may be in user mode drivers/services or simple applications.

The present storage virtualization system disk is agnostic of the storage device hardware and type, block device architectures, file system architectures, object store architectures, distributed data store architectures, and other storage management aspects of operation systems.

Figure 3:
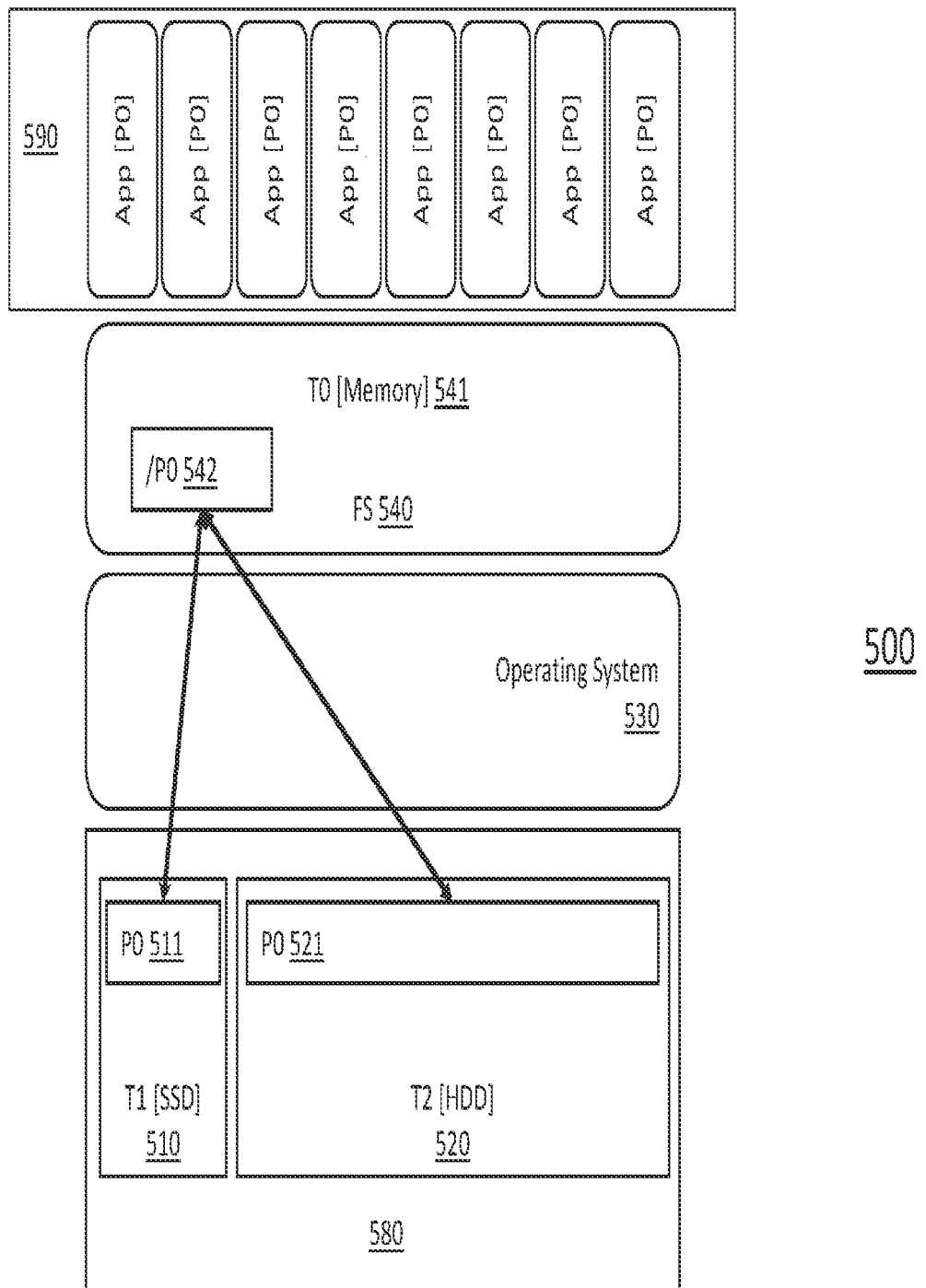
FIG. 3 illustrates an exemplary storage virtualization system for running an application, according to one embodiment.

FIG. 3 illustrates an exemplary storage virtualization system 500 for running an application 590, according to one embodiment. Storage virtualization system 500 may be a compute node that includes Tier 0 in-memory cache 541, which provides fast access to hot frequently-used data. File system (FS) 540 manages T0 in-memory cache 541, for a partition P0 mounted on directory/P0 542 and manages data transfers between T0 cache 541, T1 cache 511 and T2 storage 521 components for partition P0. The filesystem 540 can be a kernel mode driver or a user mode application.

Hardware platform 580 includes Tier 1 cache 510 and Tier 2 520 storage shared amongst multiple partitions including P0 511 and 521. Tier 1 inclusive cache 510 also holds hot frequently-accessed data but in much larger volumes and resides on non-volatile storage devices, such as a solid state drive (SSD). According to one embodiment, an Inclusive cache is a T1 cache that contains all the information in a T0 memory cache, where T0 writes back into T1 and T1 writes back into T2. Thus, Tiers 0 and 1 caches contain only a subset of all the metadata and data blocks. Tier 2 storage 520 that holds a complete set of data including all the metadata and data blocks for the application 590, resides on non-volatile storage devices (e.g. hard disk drives (HDD)). Tier 2 storage 520 may exist in multiple forms such as filesystems, block device storage, object stores, distributed data stores, etc.

In one embodiment, T1 cache 510 resides on multiple flash storage devices (e.g., SSD, non-volatile memory express (NVMe)) conjoined into a RAID 10/50/60 configuration. Tier 2 storage 520 resides in multiple HDD storage devices conjoined into RAID 10/50/60 [RAID 10 providing mirroring+striping, RAID 50 providing parity+striping, 60 providing 2-bit-parity+striping)]. The present storage virtualization system 500 (primarily comprising of T0 cache 541 and T1 cache 510) is an overlay on top of T2 storage 520. Legacy T2 storage devices will work with the present storage virtualization system 500. In one embodiment, the present storage virtualization system architecture 500 may have T0 caches 541 up to 12 TB in size depending on memory available on compute nodes, T1 caches upto 100 TB in size, and T2 storage upto petabytes or exabytes in size, wherein T1 caches may reside on fast storage devices such as Flash SSD/NVMe that are local (direct attached) on the compute nodes, or on networked storage devices potentially connected via fast cluster interconnects like Infiniband or Ethernet connections with 40-100 Gbps speed.

Figure 4:
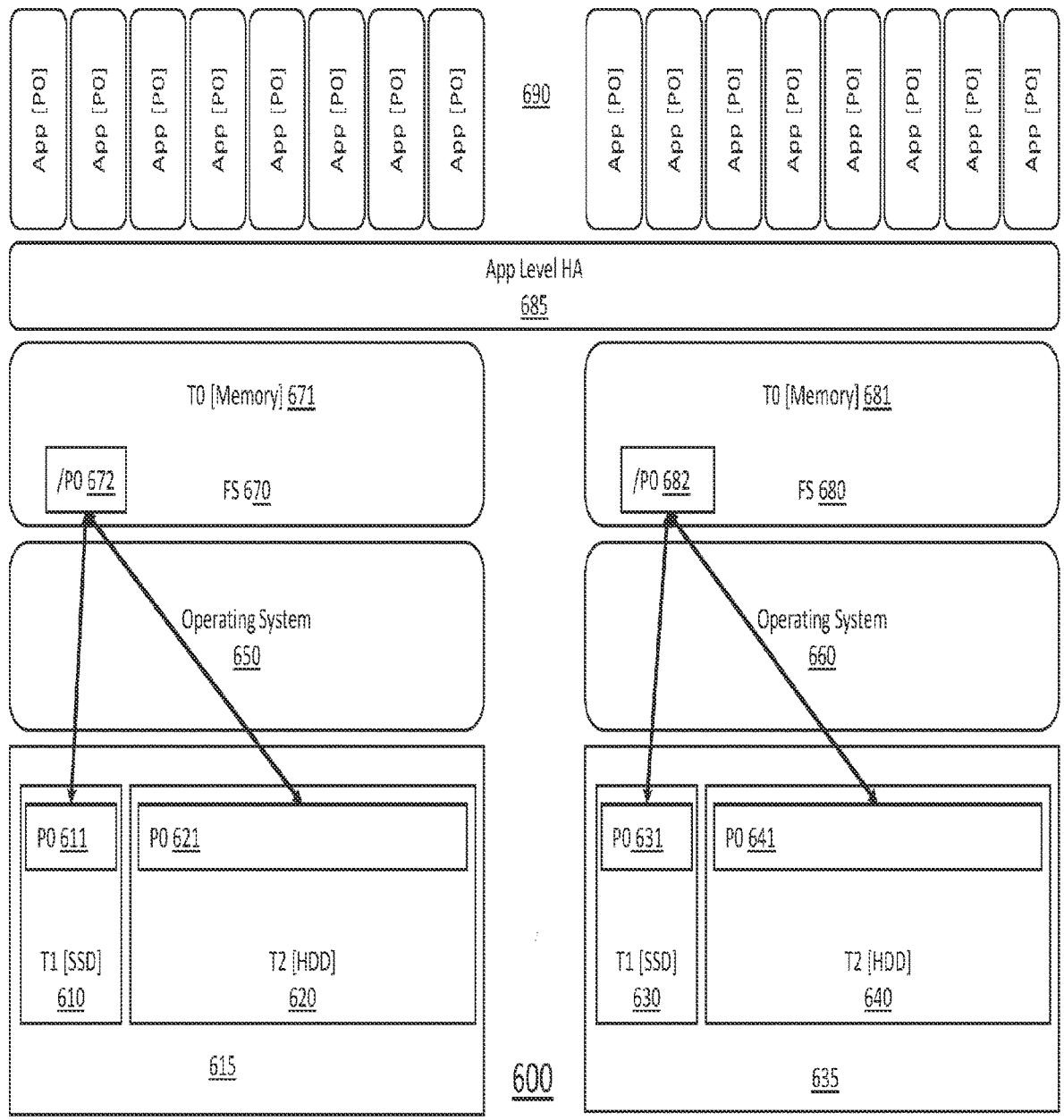
FIG. 4 illustrates an exemplary storage virtualization system including an application level high availability architecture, according to one embodiment.

FIG. 4 illustrates an exemplary storage virtualization system 600 including an application level high availability architecture like Oracle™ Real Application Cluster (RAC) 685, according to one embodiment. Storage virtualization system 600 runs application 690 across an application level high availability tier 685 running across compute nodes 615 and 635 exchanges heartbeats (handshakes) to inform each other they are alive. Storage virtualization system 600 has two compute nodes 615 and 635, however any number of compute nodes may be used. FS 670 and FS 680 have similar architecture and capabilities as FS 540 of FIG. 3.

The compute and storage level architecture in storage virtualization system 600 having HA architecture 685 is essentially the same as storage virtualization system 500. This ensures that the present storage virtualization system 600 T0 caching 671, 681 and T1 caching 610, 630 overlays the T2 storage 620, 640 in the same way as described above with storage virtualization system 500 in FIG. 3. For the avoidance of doubt, components of storage virtualization system 600 that are the same or similar to components of storage virtualization system 500 operate as described above.

Figure 5:
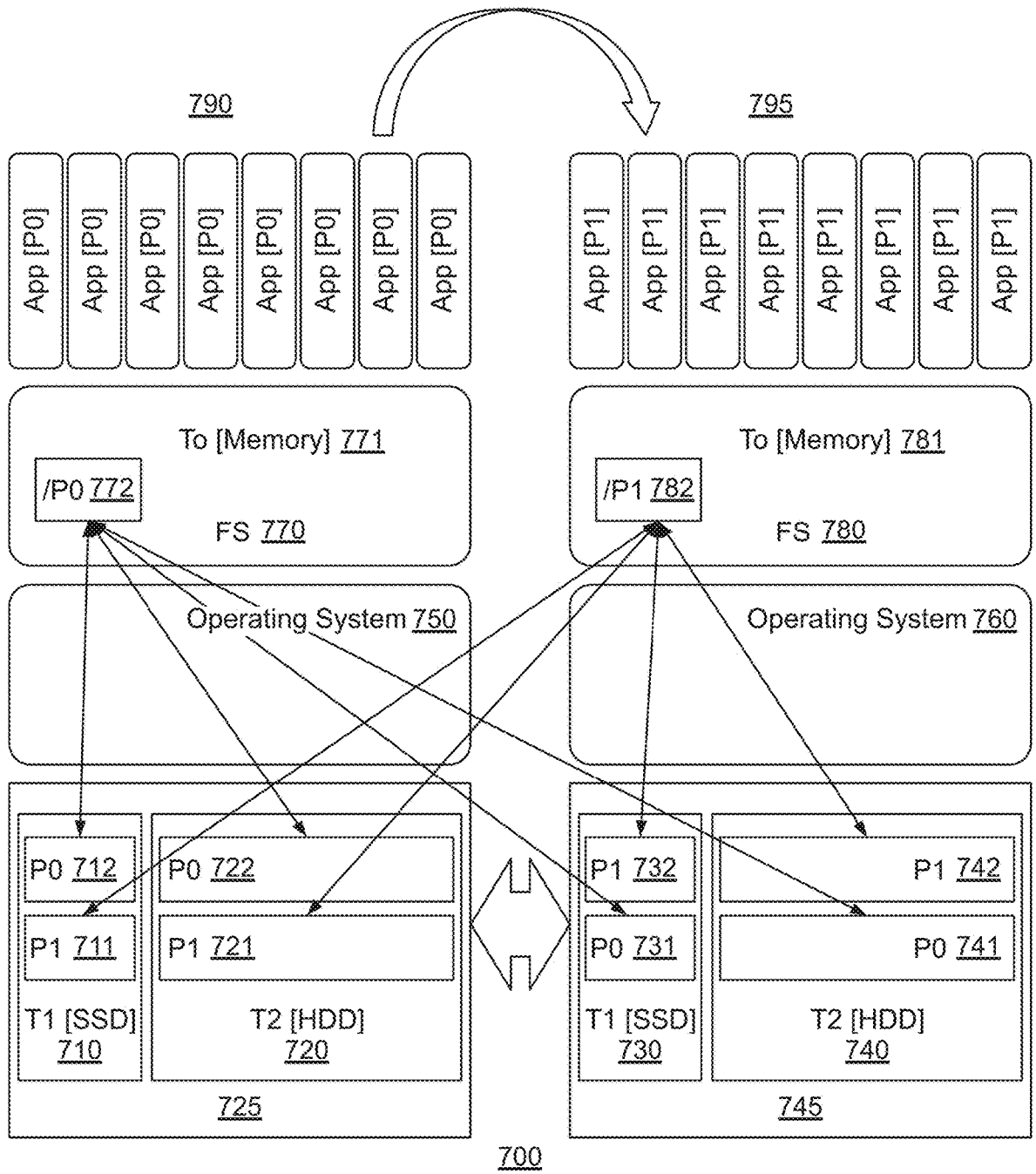
FIG. 5 illustrates an exemplary storage virtualization system for a 2-node, high availability architecture, according to one embodiment.

FIG. 5 illustrates an exemplary storage virtualization system 700 for a 2-node 725, 745 high availability architecture, according to one embodiment. System 700 includes T0 caches 771 and 781, T1 caches 710 and 730, and T2 storage 720 and 740. System 700 includes mount points 772 and 782 of the filesystems P0 and P1. Partitions (712 and 731) of T1 caches for P0 are on nodes 725 and 745, respectively. Partitions (711 and 732) of T1 caches for P1 are on nodes 725 and 745. Partitions (722 and 741) of T2 storage for P0 are on nodes 725 and 745. Partitions (721 and 742) are slices of T2 storage for P1 on nodes 725 and 745

In this embodiment, the two server/compute nodes are running two applications, P0 790 and P1 795. The T1 cache component for partition P0 712, 732 and T2 storage storage components for partition P0 722, 742 reside on both servers 725, 745. Similarly the T1 cache component for partition P1 711, 731 and T2 storage component for partition P1 721, 741 reside on both servers 725, 745. If the server 725 running application P0 790 goes down, application P0 790 can temporarily be run on the other server 745 and it can continue from where it left off because the data is locally available in Tier 1 cache 731 and Tier 2 storage 741.

Storage virtualization system 700 provides for cross-server data synchronization of FS 770 and FS 780. Tier 0 cache 771 for partition P0 of FS 770 is copied and synchronized with Tier 1 cache 731 for partition P0, as well as Tier 2 storage 741 for partition P0 on compute node 745. Tier 0 cache 781 for partition P1 of FS 780 is copied and synchronized with Tier 1 cache 711 for partition P1, as well as Tier 2 storage 721 for partition P1 on compute node 725.

Storage virtualization system 700 provides for data synchronization across Tier 0 cache, Tier 1 cache, and Tier 2 storage on the same server. Tier 0 cache 771 of FS 770 is copied and synchronized with Tier 1 cache 712, as well as Tier 2 storage 722 that are all on the same server 725. Tier 0 cache 781 of FS 780 is copied and synchronized with Tier 1 cache 732, as well as Tier 2 storage 742.

For the avoidance of doubt, components of storage virtualization system 700 that are the same or similar to components of storage virtualization system 500 operate as described above.

Figure 6:
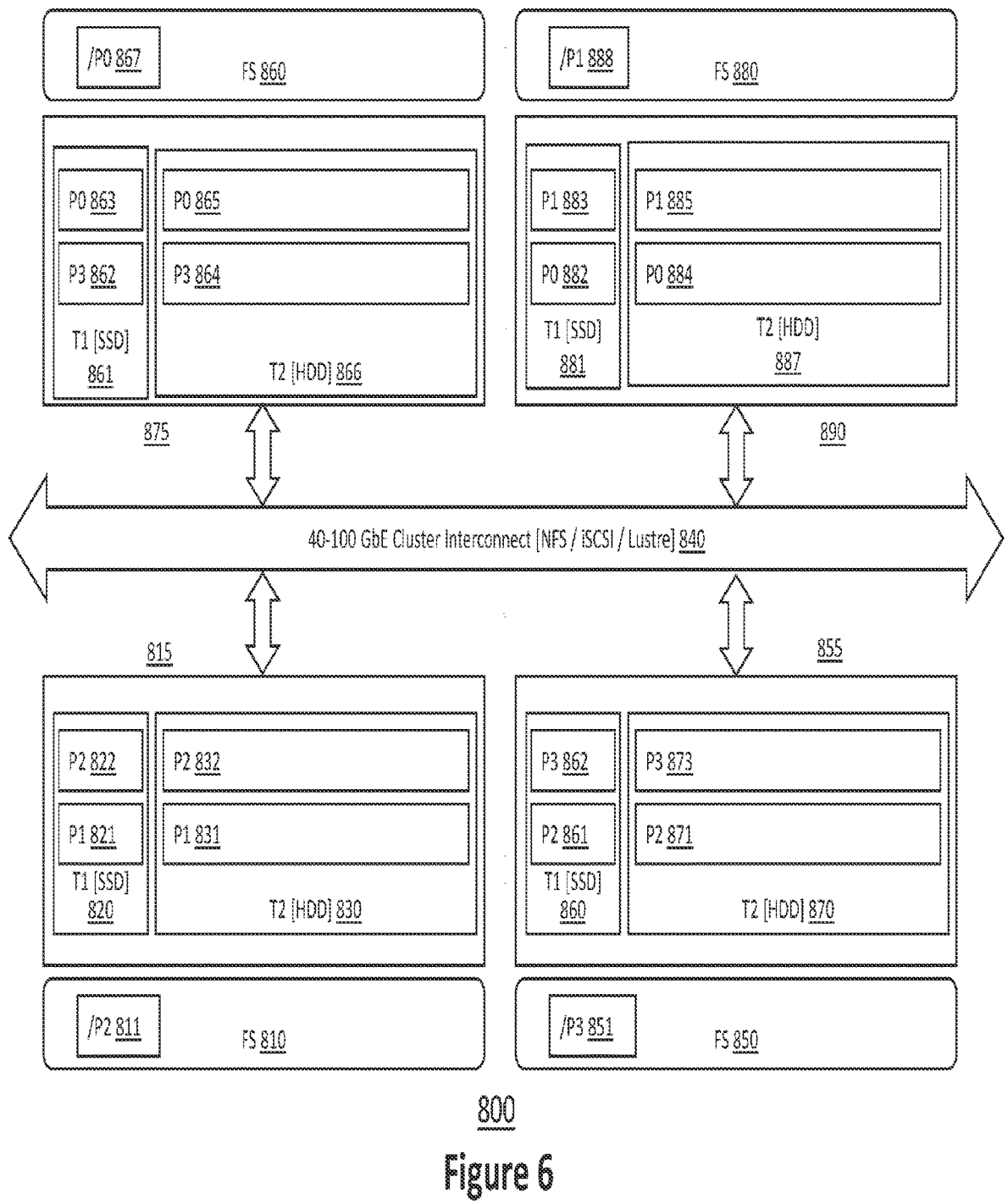
FIG. 6 illustrates an exemplary high availability storage virtualization system for multi-node clustered storage architecture, according to one embodiment.

FIG. 6 illustrates an exemplary high availability storage virtualization system 800 for a 4-node 715, 855, 875, 890 clustered storage architecture, according to one embodiment. FIG. 6 illustrates the data architecture alone (stripping out the application and operating system tiers illustrated in FIGS. 3, 4, and 5 for the sake of simplification). Storage virtualization system 800 connects nodes 715, 855, 875, 890 using a high speed interconnect network 840.

Instead of unnecessarily replicating data for all applications P0, P1, P2, and P3 on all the server/compute nodes 815, 855, 875, 890, data is recirculated in a round-robin manner—data for P0 is available on node 0 (875) and node 1 (890), the data for P1 is available on node 1 (890) and node 2 (815), the data for P2 is available on node 2 (815) and node 3 (855), and the data for P3 is available on node 3 (855) and node 0 (875). In the event of the failure of a single node, the applications therein can continue to run on other servers temporarily because the data is preserved. Although storage virtualization system 800 is shown with four nodes, any number of nodes could be deployed as described above.

For the avoidance of doubt, components of storage virtualization system 800 that are the same or similar to components of storage virtualization system 500 operate as described above.

The compact high availability clusters of the storage virtualization systems of FIG. 5 and FIG. 6 can more easily be built in a new data center, than be deployed in an existing data center. In contrast, the high availability clusters of FIG. 7 and FIG. 8 illustrate how the present storage virtualization system can be deployed in existing data centers with minimal disruption.

Figure 7:
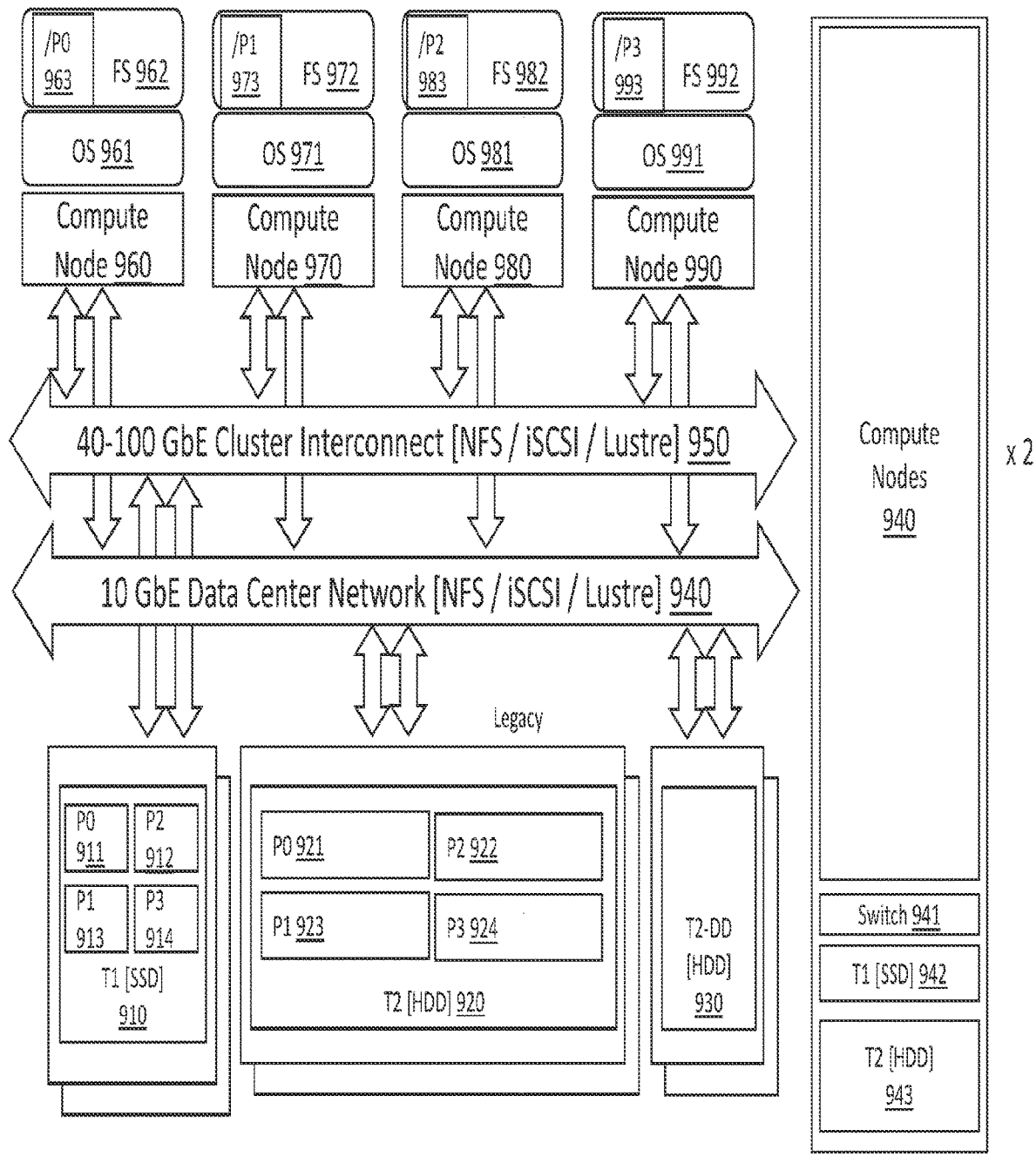
FIG. 7 illustrates an exemplary high availability storage virtualization system for a data center with centralized storage architecture, according to one embodiment.
Figure 8:
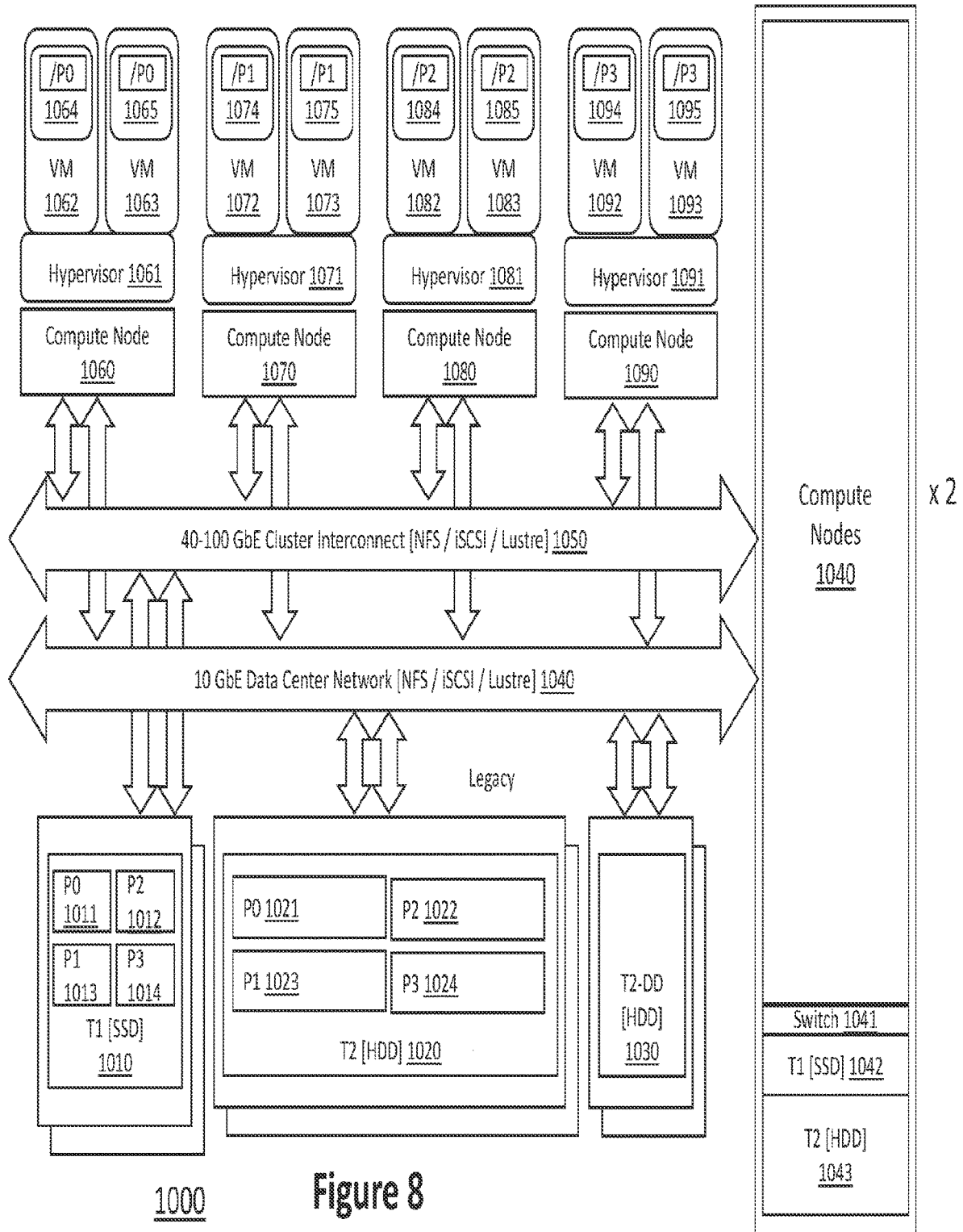
FIG. 8 illustrates an exemplary high availability storage virtualization system for a data center running virtual machines on compute nodes with centralized storage architecture, according to one embodiment.

FIG. 7 illustrates an exemplary high availability storage virtualization system 900 for a data center with centralized storage architecture, according to one embodiment. Storage virtualization system 900 includes compute nodes 960, 970, 980 and 990 that have operating systems 961, 971, 981, and 991 respectively. Nodes 960-990 also include FS 962, 972, 982, and 992. Each of FS 962, 972, 982, and 992 include in memory cache 963, 973, 983, and 993. Additional compute nodes 940 can also be used. A high speed switch 941 and additional T1 storage 942 and T2 storage 943 can be added having the same memory partitions as T1 storage 910 and T2 storage 920.

Storage virtualization system 900 includes a fast local cluster network 950 (e.g., a 100 Gb Infiniband or Ethernet). Although not shown, the compute nodes include one or more fast network interface cards (NIC) (e.g., 100 Gb). Storage virtualization system 900 includes a Tier 1 high availability storage cluster 910 and an optional Tier 2 high availability deduplication cluster 930 connected to low speed data center network 940. The present storage virtualization system presents the ability to perform offline deduplication of data in T2 storage 920. When the data center is idle, deduplication manager running on all T2 storage devices scans through the list of recently modified blocks (or files) and sends each one to a deduplication server 930 to check if the block (or file) is a duplicate of a previously existing block (or file). If a duplicate is found the block (or file) is replaced with a pointer to the existing duplicate block (or file).

Tier 1 high availability storage cluster 910 is an SSD storage system having partitions 911, 912, 913, and 914 for applications P0, P1, P2, and P3 (not shown for simplicity). Tier 2 high availability storage cluster 910 is a HDD storage system having partitions 921, 922, 923, and 924 for applications P0, P1, P2, and P3.

Storage virtualization system 900 allows 33 1 U servers/compute nodes on a rack to share T1 storage 910/941 and a 100 GbE cluster network 950 to provide a significant performance boost. For redundancy additional racks can replicate a rack with T1 storage 910 and 100 GbE cluster network 950. However, each of the compute nodes 960-990 can continue to run different applications P0-P3 while sharing the T1 storage 942 and the high speed cluster network 950 across the racks for redundancy and data resilience.

For the avoidance of doubt, components of storage virtualization system 900 that are the same or similar to components of storage virtualization system 500 operate as described above.

FIG. 8 illustrates an exemplary high availability storage virtualization system 1000 for a data center running virtual machines on compute nodes with centralized storage architecture, according to one embodiment. Storage virtualization system 1000 includes compute nodes 1060, 1070, 1080 and 1090 that have operating systems 1061, 1071, 1081, and 1091 respectively. Nodes 1060-1090 also include virtual machines 1062, 1063, 1072, 1073, 1082, 1083, 1092, and 1093. Each virtual machine (e.g., VM 1062) include a virtual file system (e.g., FS 1062) that includes a virtual in-memory cache 1064 for application P0 (not shown). Additional compute nodes 1040 can also be used. A high speed switch 1041 and additional T1 storage 1042 and T2 storage 1043 can be added having the same memory partitions as T1 storage 1010 and T2 storage 1020.

Storage virtualization system 1000 includes a fast local cluster network 1050 (e.g., a 100 Gb Infiniband or Ethernet). Although not shown, the compute nodes include one or more fast network interface cards (NIC) (e.g., 100 Gb). Storage virtualization system 1000 includes a Tier 1 high availability storage cluster 1010 and an optional Tier 2 high availability deduplication cluster 1030 connected to low speed data center network 1040.

The present storage virtualization system employs an understanding of the relative speeds of different network interfaces on each computers to efficiently route control plane operations to lower bandwidth interfaces and data plane operations to higher bandwidth interfaces.

For the avoidance of doubt, components of storage virtualization system 1000 that are the same or similar to components of storage virtualization system 500 operate as described above. Storage virtualization system 900 and storage virtualization system 1000 illustrated in FIGS. 7 and 8 allow T1 storage (including metadata and data for T0 and T1 caches) for any application to be accessed from anywhere over the cluster network (e.g., interconnect 850, interconnect 950) which can be anywhere inside a data center (perhaps restricted to the current geographical location). Thus applications can be live migrated from any compute node to any other compute node transparently. Even non-virtualized applications can be restarted on any compute node and will resume from where the last instance left off.

The present storage virtualization system is the first true device (hardware or software) to render consolidated storage acceleration and data protection via data tiering, data caching, storage level high availability across multiple physical computers and storage servers, deduplication, and compression.

Figure 9:
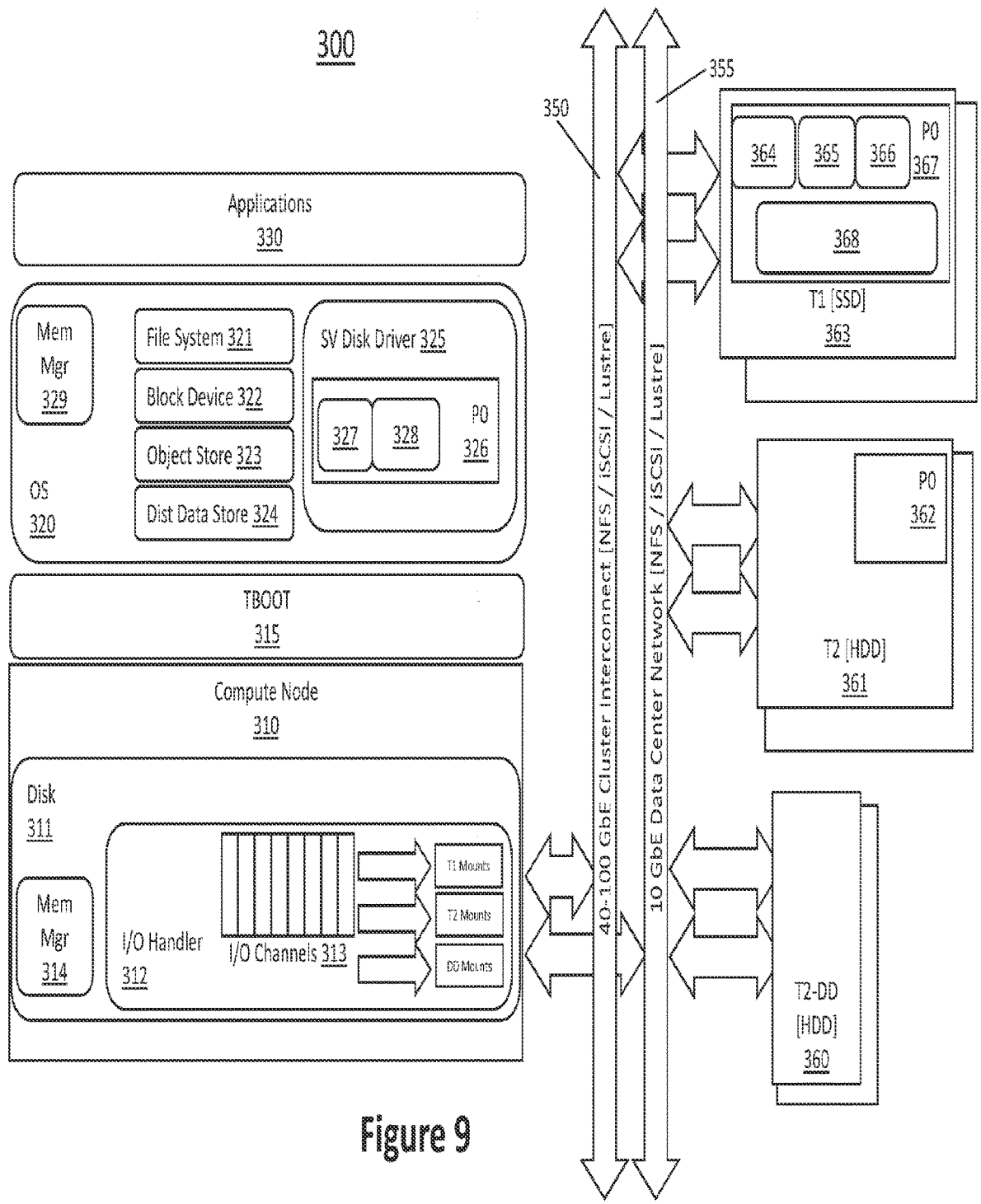
FIG. 9 illustrates an exemplary hardware implementation of storage virtualization system disk in a storage virtualization system where T0 cache is managed by the storage virtualization driver under the control of the storage virtualization disk (hardware), according to one embodiment.

FIG. 9 illustrates an exemplary hardware implementation of storage virtualization system disk 311 in a storage virtualization system 300 where T0 cache is managed by the storage virtualization driver under the control of the storage virtualization disk (hardware), according to one embodiment. Disk 311 has a memory manager 314 and an I/O handler 312. In one embodiment it is assumed that T1 cache 367 and T2 storage 362 comprise of partitions like P0 are organized as filesystems and can be mounted on compute node 310 such a way that the I/O handler 312 can access the data in these filesystems. I/O handler 312 includes 8 I/O channels 313 that communicate with Tier 1, Tier 2, and deduplication mounts. Storage virtualization system disk 311 is built into a ×8 (8 lane) PCIe card having 8 I/O channels each capable of communicating with the operating system 320 and applications 330 at speeds of 8 (PCIe 3.0) to 16 (PCIe 4.0) GB/sec. Disk 311 plugs into compute node 310.

Compute node 310 also includes an operating system 320 with memory manager 329. OS 320 includes file system driver 321, block device driver 322, object stored driver 323, distributed data store driver 324 and SV disk driver 325. The filesystem driver 321 enables a partition organized as SV FS to be mounted on a directory so that applications can access data directly as files. The block device (BD) interface 322 helps the partitions be organized as a SV BD and presented to other filesystems like ext4, ntfs, ufs, etc. The connectors to object stores enable the partitions to be organized as object stores like Ceph RADOS, Amazon S3, Openstack Swift etc. The connectors to distributed data stores enables the partitions to be organized as distributed data stores like Hadoop Distributed File System (HDFS) and Cassandra All drivers 321, 322, 323, and 324 work with the SV disk driver 325 to access the partitions and organize the data on the partitions. The present SV disk driver 325 maintains an in-memory cache 326 for hot data (Tier 0 327 and Tier 1 328) in the system memory of the server/compute node 310.

Data coherency in the cache is controlled by the present storage virtualization system disk as explained below. Memory managers 314 and 329 ensures the efficient placement of cached data on memory pages as described below. The memory manager 329 in the OS 320 receives commands from memory manager 314 of SV disk 311 to perform cache fills and cache evictions. These decisions are made based on data access history maintained by the memory manager 314 on the SV disk 311. The memory manager 314 may apply multiple optimizations while it chooses memory pages to use a data block. In one embodiment, in computers which support Non Uniform Memory Access (NUMA), the memory manager 314 uses awareness of the CPU affinity of threads to place data referenced by these threads in local NUMA memory regions.

Storage virtualization system 300 includes a high speed cluster interconnect 350 and a lower speed data center network 355. Node 310 communicates using both interconnect 350 and network 355. Storage virtualization system 300 includes Tier 1 storage 363 connected to interconnect 350, Tier 2 storage connected to network 355 and Tier 2 deduplication 360 connected to network 355. In alternate embodiments some or all components of storage virtualization system 300 communicate over the same network, whether interconnect 350 or network 355. Tier 1 cache 363 includes sub-partitions 364 for Tier 0 metadata, 365 for Tier 0 read cache, 366 for T0 write cache and 368 for T1 read-write cache within partition P0 367 to cache information for application P0. Tier 2 storage 361 includes partition P0 362 to cache information for application P0, including Tier 1 data.

For the avoidance of doubt, components of storage virtualization system 300 that are the same or similar to components of storage virtualization system 500 operate as described above.

Figure 10:
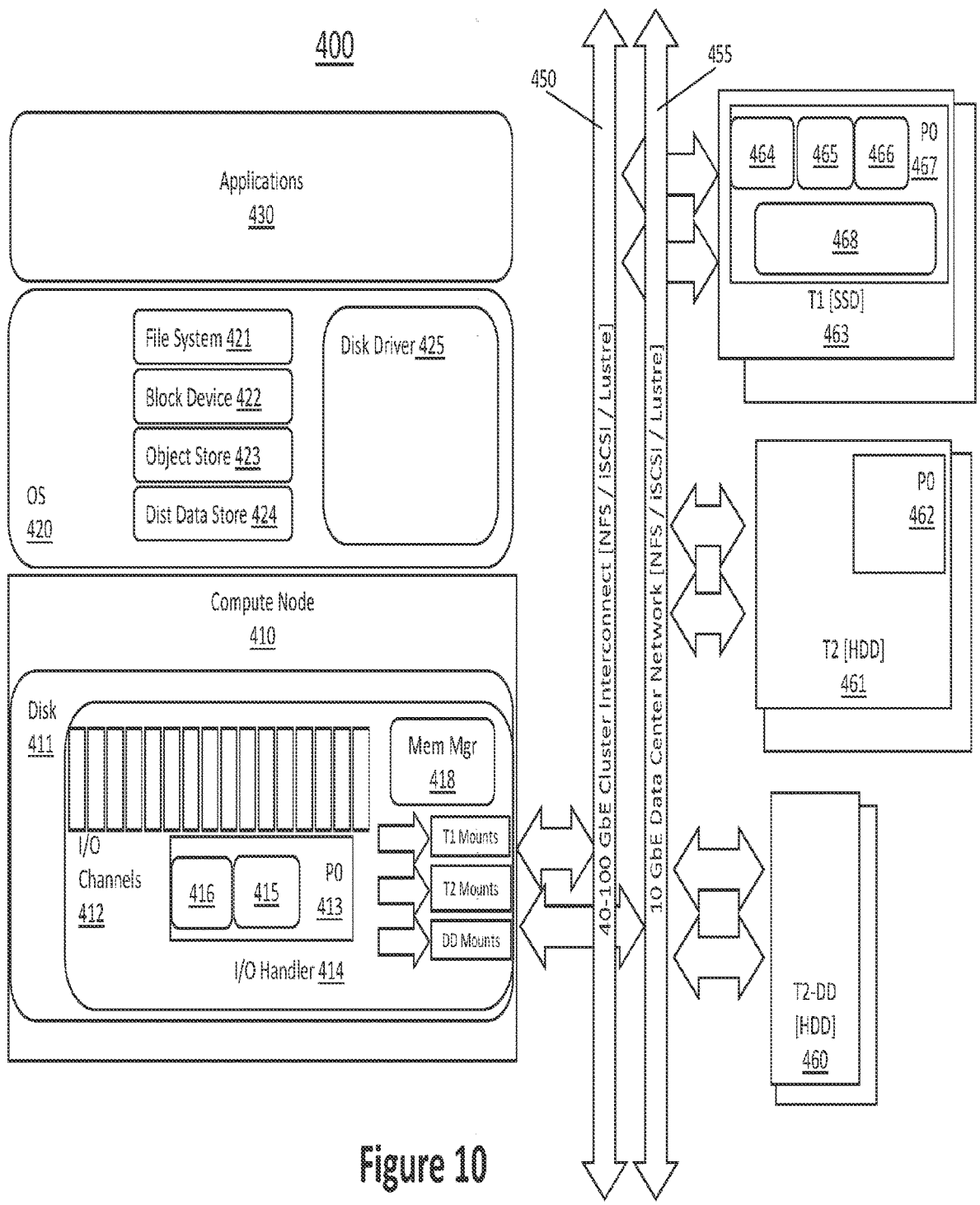
FIG. 10 illustrates an exemplary hardware implementation of storage virtualization system disk in a storage virtualization system where the T0 cache is managed by storage virtualization disk (hardware), according to one embodiment.

FIG. 10 illustrates an exemplary hardware implementation of storage virtualization system disk 411 in a storage virtualization system 400 where T0 cache is managed by storage virtualization disk (hardware), according to one embodiment. Storage virtualization system disk 411 is built into a ×16 (16 lane) PCIe card. The present storage virtualization system disk 411 communicates to the operating system 420 and applications 430 at speeds of 16 (PCIe 3.0) to 32 (PCIe 4.0) GB/sec. This card additionally has enough on-board RAM to implement coherent in-memory cache. Storage virtualization system 400 does not include a memory manager in either operating system 420, or in SV disk 411. SV disk 411 includes in memory cache 413 for application P0. In memory cache 413 includes cache 416 for Tier 0 data and cache 415 for Tier 1 data. T0 cache 416 for P0 413 is managed by the SV disk 411.

According to one embodiment, each PCIe card may be a SV system disk. There can be up to 10×8 PCIe 3.0 cards/SV system disks or 4×16 PCIe 3.0 cards/SV system disks on a 2 CPU Intel Xeon E5-26xx compute node. Each Intel Xeon E5-26xx CPU is capable of supporting up to 40 PCIe lanes.

For the avoidance of doubt, components of storage virtualization system 400 that are the same or similar to components of storage virtualization systems 300 and 500 operate as described above.

Both storage virtualization system 300 and storage virtualization system 400 present SV disk partitions to their operating systems and applications that may be used as a file system, or a block device. Both storage virtualization system 300 and storage virtualization system 400 may be used as interface (connectors) to work with remote object stores, or distributed data stores (as explained above). Although only showing one partition (P0), both storage virtualization system 300 and storage virtualization system 400 can have multiple partitions.

Figure 11:
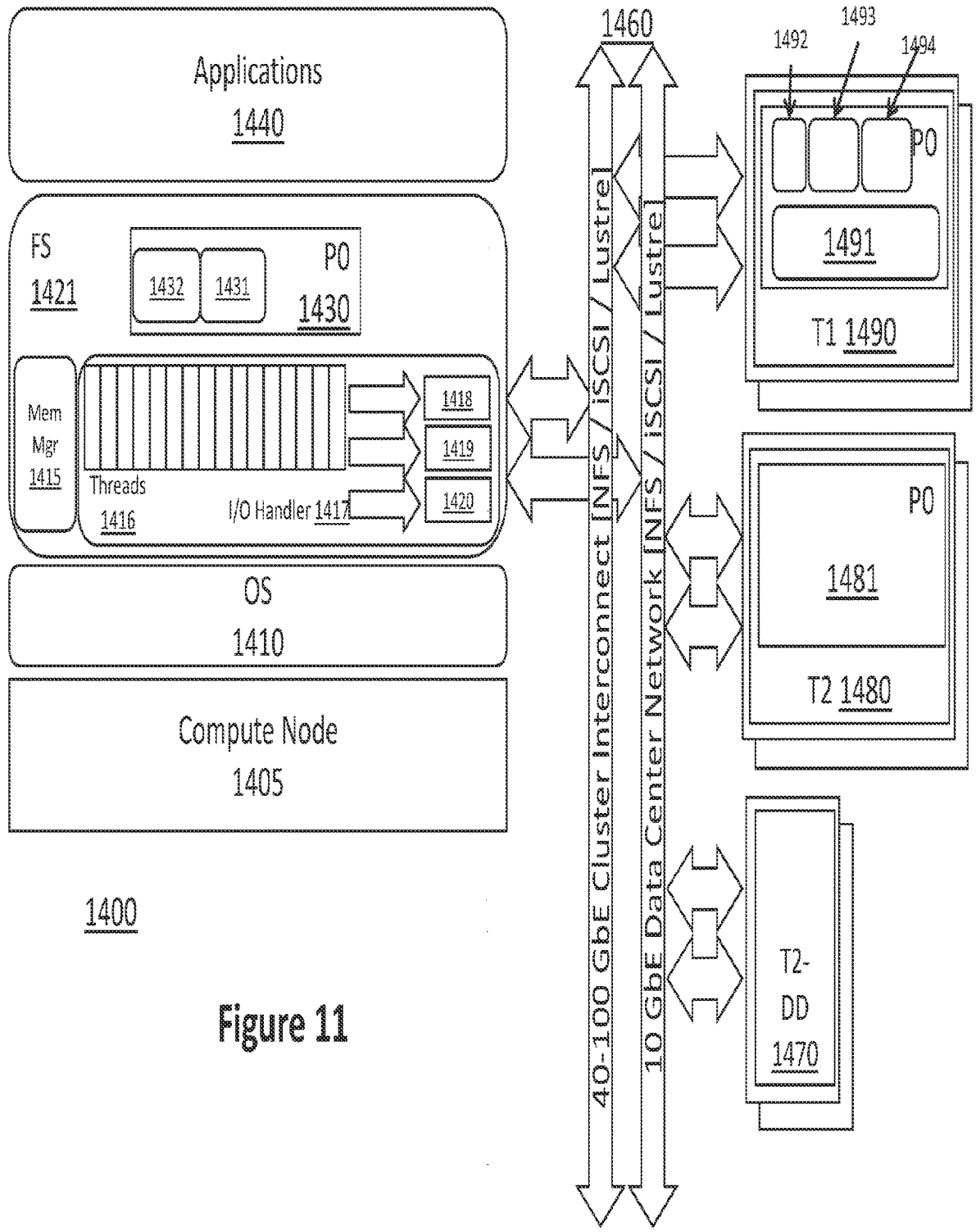
FIG. 11 illustrates an exemplary storage virtualization disk in a storage virtualization file system (FS) in a software implementation of storage virtualization system where the T0 cache is managed by the storage virtualization filesystem, according to one embodiment.

FIG. 11 illustrates an exemplary storage virtualization disk in a storage virtualization file system (FS) 1421 in a software implementation of a storage virtualization system 1400 where the T0 cache is managed by the storage virtualization file system, according to one embodiment. Storage virtualization system 1400 illustrates a software implementation of an SV disk (e.g., SV disk 311, SV disk 411).

Storage virtualization system 1400 includes applications 1440, a storage virtualization file system (FS) 1421, an operating system 1410, compute node 1405, interconnect and network 1460, Tier 1 storage 1490, Tier 2 storage 1480 and optional Tier 2 deduplication server 1470.

FS 1421 includes virtual in-memory cache partition 1430 for application P0. Partition 1430 includes sub-partitions for Tier 0 data 1432, and Tier 1 data 1431. I/O Handler 1417 uses software threads (e.g., 16 threads or virtual I/O channels 1416) to implement the parallel I/O channels provided by parallel PCIe lanes in the hardware embodiments described above in FIGS. 9 and 10. I/O Handler 1417 includes T1 mount 1418, T2 Mount 1419, and T2-deduplication mount 1420. FS 1421 also includes a memory manager 1415 that manages T0 cache in memory that is dynamically allocated from the system, and manages coherency of cached data across of compute nodes.

For the avoidance of doubt, components of storage virtualization system 1400 that are the same or similar to components of storage virtualization systems 300 and 500 operate as described above.

Figure 12:
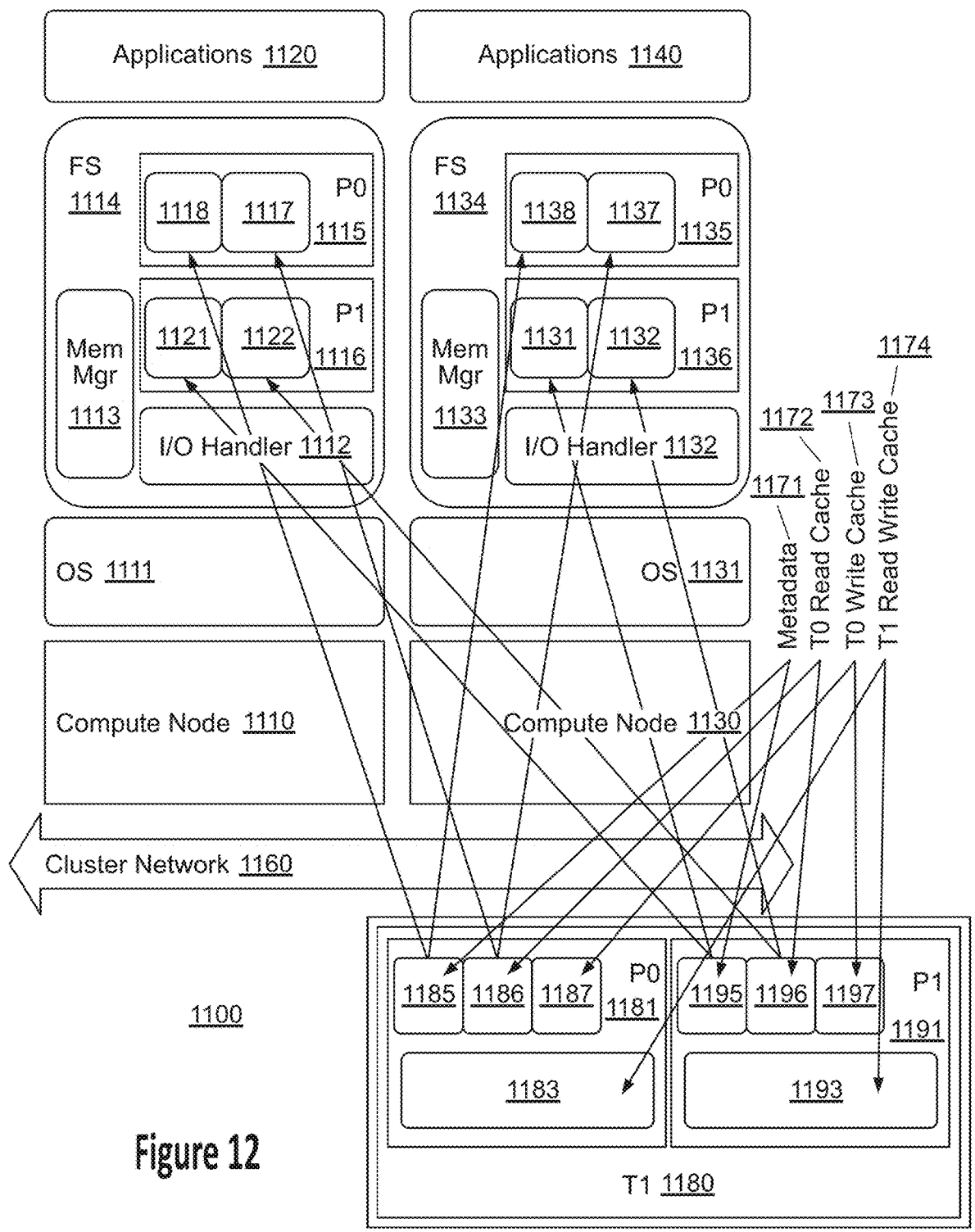
FIG. 12 illustrates an exemplary storage virtualization file system (FS) in a multi-node storage virtualization system with multiple readers, according to one embodiment.

FIG. 12 illustrates an exemplary storage virtualization file system (FS) 1114 in a multi-node storage virtualization system 1100 with multiple readers, according to one embodiment. Storage virtualization system 1100 illustrates a software implementation of an SV disk (e.g., SV disk 311, SV disk 411). Multi-node storage virtualization system 1100 allows for multiple readers across multiple nodes.

Storage virtualization system 1100 includes applications 1120, 1140; storage virtualization file systems (FS) 1114, 1134; operating systems 1111, 1131; compute nodes 1110, 1130, and Tier 1 storage 1180. According to one embodiment, node 1110 is running application P0 and node 1130 is running application P1.

Tier 1 storage 1180 includes application P0 partition 1181 and application P1 partition 1191. P0 partition 1181 has metadata sub-partition 1185 for P0 metadata; T0 read cache sub-partition 1186 for P0 Tier 0 data; T0 write cache sub-partition 1187 for P0 Tier 0 data; and T1 Read Write cache sub-partition 1183 for P0 Tier 1 data. P0 partition 1191 has metadata sub-partition 1195 for P1 metadata; T0 read cache sub-partition 1196 for P1 Tier 0 data; T0 write cache sub-partition 1197 for P1 Tier 0 data; and T1 Read Write cache sub-partition 1193 for P1 Tier 1 data.

File system 1114 of node 1110 includes a memory manager 1113, I/O handler 1112, application P0 partition 1115, and application P1 partition 1116. Application P0 partition 1115 includes metadata sub-partition 1118 for P0 metadata; and T0 read cache sub-partition 1117 for P0 Tier 0 data. Application P1 partition 1116 includes metadata sub-partition 1121 for P1 metadata; and T0 read cache sub-partition 1122 for P1 Tier 0 data.

File system 1134 of node 1130 includes a memory manager 1133, I/O handler 1132, application P0 partition 1135, and application P1 partition 1136. Application P0 partition 1135 includes metadata sub-partition 1138 for P0 metadata; and T0 read cache sub-partition 1137 for P0 Tier 0 data.

Application P1 partition 1136 includes metadata sub-partition 1131 for P1 metadata; and T0 read cache sub-partition 1132 for P1 Tier 0 data.

For the avoidance of doubt, components of storage virtualization system 1100 that are the same or similar to components of storage virtualization system 1400 operate as described above.

Figure 13:
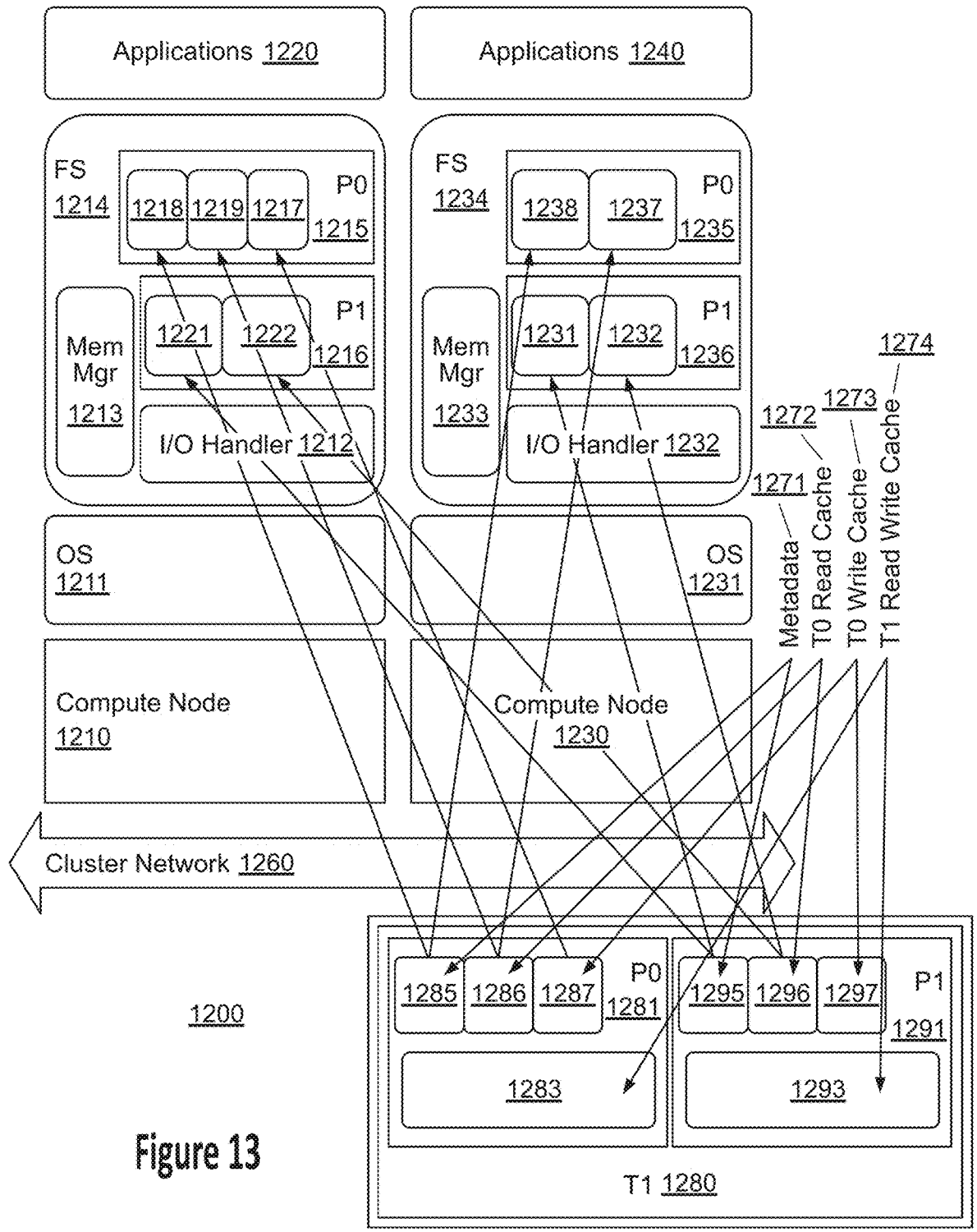
FIG. 13 illustrates an exemplary storage virtualization file system (FS) in a multi-node storage virtualization system with a single writer and multiple readers, according to one embodiment.

FIG. 13 illustrates an exemplary storage virtualization file system (FS) 1214 in a multi-node storage virtualization system 1100 with a single writer and multiple readers, according to one embodiment. Storage virtualization system 1200 illustrates a software implementation of an SV disk (e.g., SV disk 311, SV disk 411). Multi-node storage virtualization system 1200 allows for a single writer and multiple readers across multiple nodes.

Storage virtualization system 1200 includes applications 1220, 1240; storage virtualization file systems (FS) 1214, 1234; operating systems 1211, 1131; compute nodes 1210, 1230, and Tier 1 storage 1280. According to one embodiment, node 1210 is running application P0 and node 1230 is running application P1.

Tier 1 storage 1280 includes application P0 partition 1281 and application P1 partition 1291. P0 partition 1281 has metadata sub-partition 1285 for P0 metadata; T0 read cache sub-partition 1286 for P0 Tier 0 data; T0 write cache sub-partition 1287 for P0 Tier 0 data; and T1 Read Write cache sub-partition 1283 for P0 Tier 1 data. P0 partition 1291 has metadata sub-partition 1295 for P1 metadata; T0 read cache sub-partition 1296 for P1 Tier 0 data; T0 write cache sub-partition 1297 for P1 Tier 0 data; and T1 Read Write cache sub-partition 1293 for P1 Tier 1 data.

File system 1214 of node 1110 includes a memory manager 1213, I/O handler 1212, application P0 partition 1215, and application P1 partition 1216. Application P0 partition 1215 includes metadata sub-partition 1218 for P0 metadata; T0 read cache sub-partition 1219 for P0 Tier 0 data; and T0 write cache sub-partition 1217 for P0 Tier 0 data. Application P1 partition 1216 includes metadata sub-partition 1221 for P1 metadata; and T0 read cache sub-partition 1222 for P1 Tier 0 data.

File system 1234 of node 1230 includes a memory manager 1233, I/O handler 1232, application P0 partition 1235, and application P1 partition 1236. Application P0 partition 1235 includes metadata sub-partition 1238 for P0 metadata; and T0 read cache sub-partition 1237 for P0 Tier 0 data. Application P1 partition 1236 includes metadata sub-partition 1231 for P1 metadata; and T0 read cache sub-partition 1332 for P1 Tier 0 data.

For the avoidance of doubt, components of storage virtualization system 1200 that are the same or similar to components of storage virtualization system 1400 operate as described above.

Figure 14:
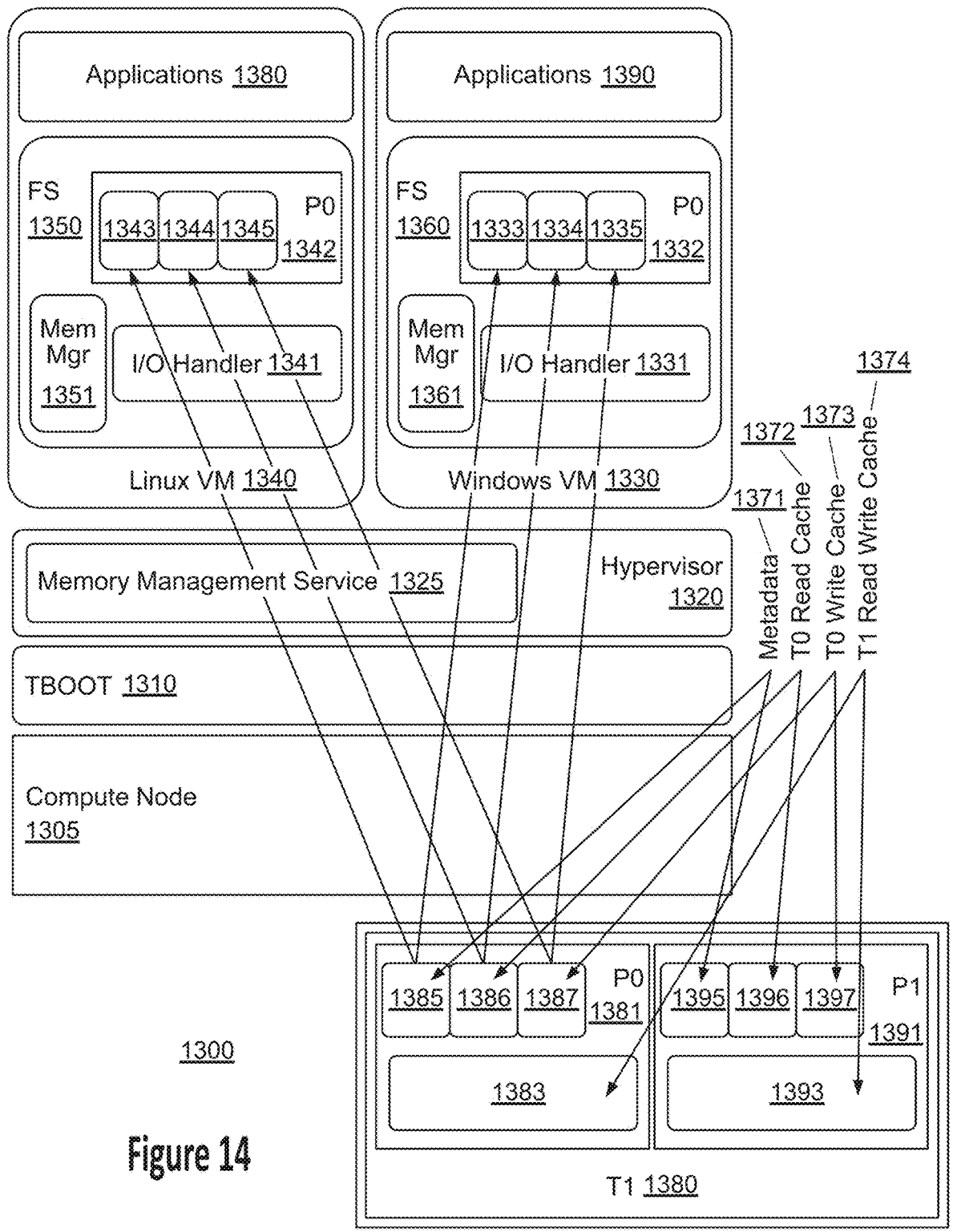
FIG. 14 illustrates an exemplary storage virtualization file system (FS) in a storage virtualization system having virtual machines with multiple writers and multiple readers, according to one embodiment.

FIG. 14 illustrates an exemplary storage virtualization file system (FS) 1350 in a storage virtualization system 1300 having virtual machines with multiple writers and multiple writers, according to one embodiment. Storage virtualization system 1300 illustrates a software implementation of an SV disk (e.g., SV disk 311, SV disk 411). Storage virtualization system 1300 allows for multiple writers across virtual machines on the same physical computer (e.g., compute node 1305).

Storage virtualization system 1300 includes virtual machines 1330 and 1340 that may run different operating systems. Virtual machine 1340 may be a Linux virtual machine, and virtual machine 1330 may be a Microsoft™ Windows virtual machine. Linux VM 1340 runs applications 1380, and Windows VM 1330 runs applications 1390. Linux VM 1340 and Windows VM 1330 have storage virtualization file systems (FS) 1350, 1360, respectively. Storage virtualization system 1300 also includes hypervisor 1320, and TBOOT 1310. According to one embodiment, VM 1340 is running application P0 and VM 1330 is running the same application P0.

Tier 1 storage 1380 includes application P0 partition 1381 and application P1 partition 1391. P0 partition 1381 has metadata sub-partition 1385 for P0 metadata; T0 read cache sub-partition 1386 for P0 Tier 0 data; T0 write cache sub-partition 1387 for P0 Tier 0 data; and T1 Read Write cache sub-partition 1383 for P0 Tier 1 data. P1 partition 1391 has metadata sub-partition 1395 for P1 metadata; T0 read cache sub-partition 1396 for P1 Tier 0 data; T0 write cache sub-partition 1397 for P1 Tier 0 data; and T1 Read Write cache sub-partition 1393 for P1 Tier 1 data.

File system 1350 of VM 1340 includes a memory manager 1351, I/O handler 1341, and application P0 partition 1342. Application P0 partition 1342 includes metadata sub-partition 1343 for P0 metadata; T0 read cache sub-partition 1344 for P0 Tier 0 data; and T0 write cache sub-partition 1345 for P0 Tier 0 data.

File system 1360 of VM 1330 includes a memory manager 1361, I/O handler 1331, and application P0 partition 1332. Application P0 partition 1332 includes metadata sub-partition 1333 for P0 metadata; T0 read cache sub-partition 1334 for P1 Tier 0 data and T0 write cache sub-partition 1335 for P0 Tier 0 data.

For the avoidance of doubt, components of storage virtualization system 1100 that are the same or similar to components of storage virtualization system 1400 operate as described above.

The hypervisor 1320 is responsible for bringing up the virtual machines and mapping the T0 components of partition P0 1342 (metadata 1343, read cache 1344, write cache 1345) in VM 1340 using memory management service 1325 and memory manager 1351. Similarly the T0 components of partition P1 1332 (metadata 1333, read cache 1334, write cache 1335) are mapped in VM 1330 using the memory manager 1361.

In the embodiments described above, the storage virtualization systems are backed with tiered storage as follows:
- T0 in-memory cache. Although illustrated as a per-partition cache, additional embodiments provide single system wide caches and other cache architectures as well.
- T1 persistent cache on persistent (non-volatile) storage devices on high-speed storage devices, such as Flash SSD/NVMe with high availability (redundancy).
- T2 persistent storage on HDDs (can be any media) with high availability storage servers.
- Optional T2 deduplication cache on HDDs (can be any media) with high available storage servers.

In the embodiments above, persistent tiers (T1 and T2) may be direct attached storage devices or network attached. T1 storage devices may be connected via a fast 40-100 Gbps Infiniband or GbE cluster networks within the same data center. T2 storage devices may be connected via data center networks (typically 10 GbE) and may span across data centers in multiple geographical locations.

T1 storage may include the following components:
- Metadata (e.g., metadata 1171, 1271, 1371) including a unified T0/T1 cache (hashtable), shared data structures (filesystem descriptors, file descriptors, etc.);
- T0 Read Cache Blocks (e.g., 1172, 1272, 1372);
- T0 Write Cache Blocks (e.g., 1173, 1273, 1373); and
- T1 Read/Write Cache Blocks (e.g., 1174, 1274, 1374).

The metadata and the T0 read/write cache blocks from T1 storage is directly memory-mapped in the in-memory T0 cache (either in system memory or in on-board memory of the PCIe card). This ensures that the state of the metadata and T0 in-memory cache are persisted to disk at all points of time. Even in the case of a writeback configuration, this persistence is enforced by the operating system at a system shutdown or whenever the present storage virtualization system disk (Driver) is shutdown—even at a system crash as long as system dirty pages are flushed to backing stores. This facilitates a system to preserve the state of T0 cache across system reboots. Warm caches are not required after a reboot.

The T0 cache is shared across multiple physical computers which may be running heterogenous operating systems (e.g., one running Windows and another running Linux). Two properties of the present storage virtualization system caches that are not possible with existing pagecache architectures:
- sharing across physical computers—multi-root, and
- sharing across heterogenous operating systems—multi-domain or multi-os).

According to one embodiment, segregated T0 caches are used for read and write. This partitioning enforces that a read block is never written to. Thus, as with systems 1100 and 1200, multiple physical computers can share T0 caches—one writer (in exclusive mode) and multiple readers. This is made possible by the memory manager 1361 that segregates the read blocks from the write blocks. The memory manager 1361 metadata keeps track of the readers and writers at a file or block level. Only when a block which was originally read-only is attempted to be written to, the readers of the block are intimated about the change to the block.

In software architectures such as client-servers, it is very rare that a file is written and read at the same time on multiple physical computers, such that the data invalidation cost to enforce coherency is trivial. This is more efficient than traditional shared caches where every write requires an invalidation to be broadcast to all readers. The memory managers of the virtual machine embodiments described above ensure the most efficient conservation of memory across guest operating systems running on a hypervisor. In one embodiment, the system is configured to boot through a multi-boot module (e.g., TBOOT 315, 1310) which has a physical memory allocator that pre-allocates a pre-defined amount of memory (e.g., 60-75% of system memory) for use by the present storage virtualization system in-memory caching, modifies the memory map (e.g., E820 tables) to mark the pre-allocated SV memory as "Reserved for SV" or writes the memory ranges corresponding to the pre-allocated memory on a secret memory page which the hypervisor (or supervisory operating system such as Xen Dom0) can read later on, and then continues to boot the hypervisor. These functions are performed by a physical memory allocator in the multi-boot module (like TBOOT). During initialization, the present storage virtualization system memory managers read the range of pre-allocated memory and initializes the page allocation table. When a file block needs to be mapped, it is assigned a unique memory page. Due to deduplication, there may be multiple instances when the same file block will be accessed across multiple guest operating systems (e.g., common system files). The memory manager maintains a map of file blocks to the unique memory pages that hold the data. When a guest application requests a block of data to be read (or written), the hypervisor hands over the request to the SV driver which invokes the memory manager services to ensure that the same physical memory page that holds the particular file block is mapped into the page table of the guest application requesting that file block at the specified guest application memory address where the data is expected. and the memory manager ensures that the same physical memory page is mapped into guest operating systems requesting that file block. Such deduplicated blocks are marked in the T0 cache as "Copy on Write"—that is, if these blocks ever get modified, then the deduplicated status of the file or block is revoked. Since shared memory on a physical computer is coherent, multi-writer caching can be permitted across guest operating systems running on a hypervisor on a physical computer.

Deduplication can be in-motion or offline. Again, deduplication may be at a block level or at a file level. Every block of data can be run by the deduplication server (T2-DD) to see if there is a duplicate. However, it is traditionally found that entire files themselves are duplicates most often—parts of files being duplicate are very rare—so a file level deduplication is possible. Deduplication may happen within a compute node or a cluster or across the data center. The probability of finding duplicates is much higher using centralized deduplication across the data center. The present storage virtualization system performs a periodic sweep across the filesystems in T2 storage and forwards the contents of each file to the deduplication server (T2-DD). If a match is found, the file in T2 storage is replaced with a pointer to the original file in the deduplication server. The unified cache is keyed on a value that is unique to the files on the primary T2 server (many unix filesystems provide a unique identified to each file called the inode number which may be used for this purpose)—so prior to replacing the file with the pointer, invalidate all blocks cached from this file at all levels of the cache (T0 and T1). During the lifetime of a deduplicated file block, if it ever gets written to, then the deduplicated status of the entire file is revoked—the symbolic link for this file is reverted to a writeable copy of the file before the write of the file block continues. In this case the file blocks corresponding to the deduplicated file should not be invalidated—these mappings are good for other instances where the deduplicated file is still used.

The present systems described above ensure the most compact representation of data in memory. For example, the memory manager can ensure transparent page mapping across multiple operating systems in the case of deduplicated file blocks.

Figure 15:
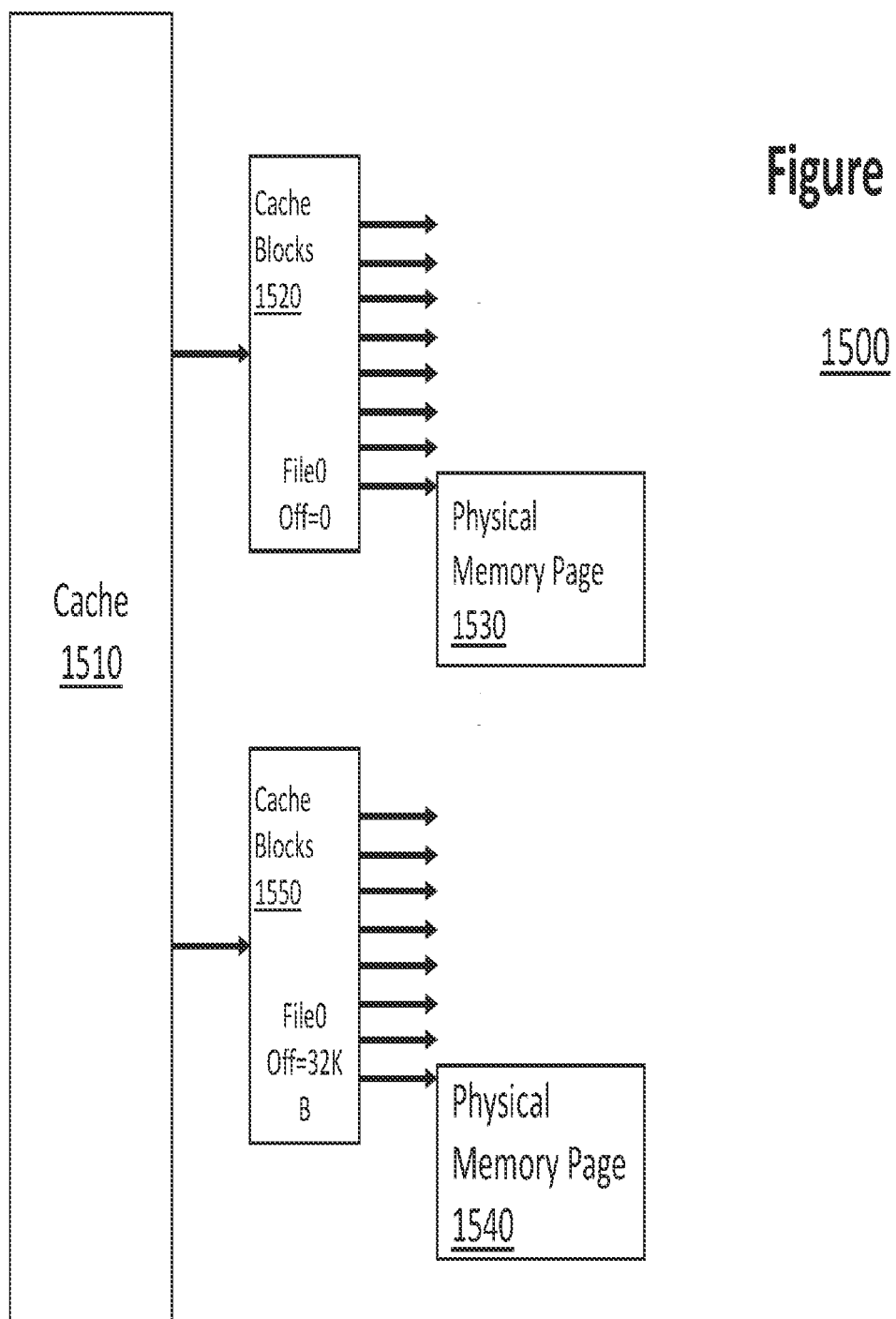
FIG. 15 illustrates an exemplary sub-blocking process that may be used by the present storage virtualization system, according to one embodiment.

The present systems may also use sub-blocking as illustrated in FIG. 15. If the present storage virtualization system cache has a block size of 32 KB, each block is broken down into 8 subblocks. Thus if a smaller range of this block (e.g., the last 4 KB of the block) is read or written, only then is one 4 KB physical memory page allocated. FIG. 15 shows for a 64 KB space only two 4 KB pages are used. This compacts memory usage, saves on space for persisting this information on T1 storage, as well as space for writing back to T2 storage.

The present systems may also use a fast in-motion compression algorithm to ensure that data fits into minimal number of memory pages.

T2 storage may also be compacted using deduplication (e.g., data center wide centralized deduplication) and compression as explained above. Because T2 storage access is not on the critical path for performance, the small compute overhead required to compress/decompress data during T2 access is minimized.

T0 cache may operate in writeback or write through modes. While the former ensures top performance because of less system interference due to persistence, the latter ensures data protection. Writeback also ensures that Flash devices (e.g., T1 storage) are written to less often (e.g., 10 or 100 times T0 data is modified). The Flash write endurance (and hence Flash lifetime) can significantly improve by 10× to 100×.

T0 metadata and cache blocks are persisted onto T1 storage and eventually written back into T2 storage. The time taken for these persistence operations is important to ensure both application speeds as well as data protection. The present storage virtualization system can parallelize the persistence operations across multiple network interface card (NIC) ports, where available, to speed up persistence.

The present storage virtualization system also ensures active writeback to clean up as many T0 dirty pages as possible, not waiting for the caches to run out of memory pages requiring reclamation and cache evictions. The present storage virtualization system also ensures a power aware time budget for persistence. The present storage virtualization system can be programmed with a safe time within which it has to finish all persistence chores depending on how long the uninterrupted power supply (UPS—battery backup) can sustain the system after a power failure. In one embodiment, when a power failure occurs and the UPS signals an SNMP alert about the switching of power to UPS, the present storage virtualization system is notified and it stops all T0 activities and starts persistence chores. Once persistence is complete and committed, the present storage virtualization system may still permit applications to run until the system is finally shutdown—but it will bypass T0 caches. Read/write operations are bound to persistence storage (typically T1).

FIGS. 12, 13, and 14 illustrate the T0 and T1 caches being shared across multiple physical and virtual computers. While T0 and T1 caches can be coherently shared among multiple virtual computers in a virtualization system (FIG. 14) by virtue of the coherency of shared memory architecture on a single physical computer, when T0 and T1 caches are shared across multiple physical computers, coherency management is effected via a messaging protocol among the memory managers of each compute node. In FIG. 13, if the memory manager 1213 detects a conflicting write (an attempt to write to a block which is in the T0 read cache), the block is first moved from T0 read cache 1219 to T0 write cache 1217, the data write is performed, and then the memory manager 1213 sends a signal via the cluster network 1260 to memory manager 1233 on compute node 1230 to invalidate and remap the T0 read cache 1237. The write operation completes only after 1233 has acknowledged to 1213 the successful completion of the invalidation operation.

Figure 16:
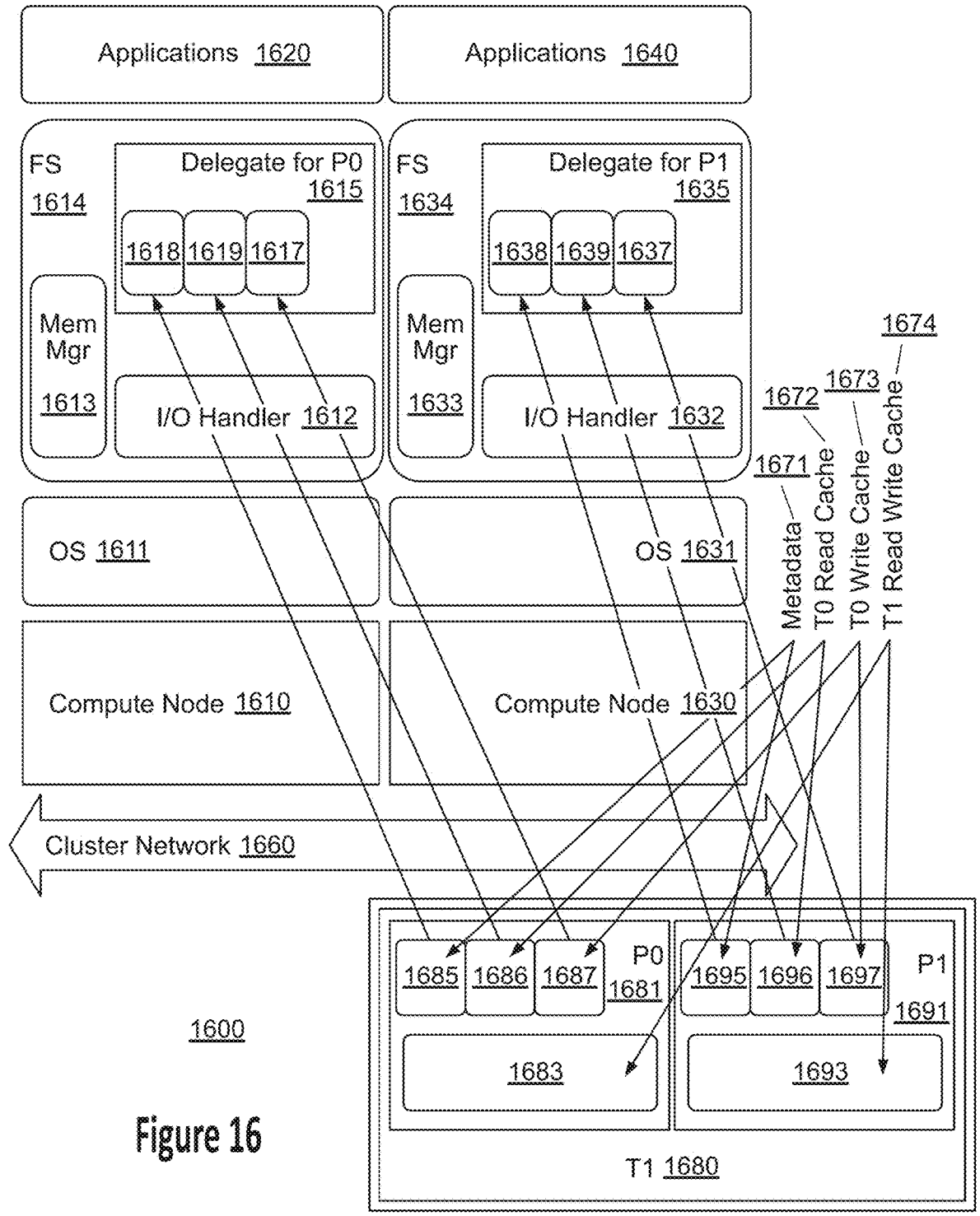
FIG. 16 illustrates an exemplary storage virtualization filesystem (FS) in a multi-node storage virtualization system with delegates to manage multiple writers and multiple readers, according to one embodiment.

FIG. 16 illustrates an exemplary storage virtualization filesystem (FS) in a multi-node storage virtualization system with delegates to manage multiple writers and multiple readers, according to one embodiment. System 1600 implements T0 cache mappings via a delegate. The filesystem 1614 on compute node 1610 has a delegate for partition P0 1615 which exclusively owns the T0 metadata 1618, T0 read cache 1619, and T0 write cache 1617. When another compute node 1630 tries to mount this partition P0, it sees information in the T0 metadata that 1610 is the delegate for the partition P0. The filesystem 1634 will redirect all control and data plane operations to the delegate 1610 on node 1612 via the cluster network 1660. Though system 1600 shows the delegates 1615 and 1635 to be designated at a partional granularity, the T0 metadata can be augmented to indicate delegates at a file level or even a block level. Thus, in one embodiment, one compute node can be the delegate of a block within a file while another compute node can be the delegate for another block in the same file.

The present storage virtualization system maintains the mapping of pathnames to disk inodes in its metadata. T0 and T1 cache blocks are keyed on the disk inode for the primary T2 storage. Once the metadata is cached in all reader and writer nodes, SV driver can look up SV metadata to determine the existence and access privileges for each file without having to do a directory walk on T2 storage device.

Many operations require temporary pseudo files to be created, used, and destroyed. For example, files in Unix/tmp filesystems are never required to be kept around after their lifetime has expired. The present storage virtualization system supports a no-write mode for partitions to be used as a temporary filesystem. Files are created as normally done in a RAM disk and once completed, these files can be deleted or reused without ever having to write to a backing storage device. The no-write partitions is a Cache Only Memory device for storage operations. A partition may be explicitly declared as "no-write" by the user. But one benefit comes from SV disk's speculative (transactional) usage model where data is treated as "no-write" by default. Data is only committed at the end of a transaction and all transient data gets overwritten in the cache and never makes it to the disk. This significantly helps boost the latency and throughput of storage operations.

One of the biggest improvements of the present storage virtualization system over contemporary in-memory caching solutions (like Linux pagecache) is its ability to rely on data access history, and use predictive algorithms to determine the best candidate blocks for eviction. One such predictive algorithm relies on the aging of data. The present storage virtualization system can find data that have been active in the past but may not be useful going forward—far more accurately than algorithms like LRU (least recently used), etc. Another improvement of the present storage virtualization system comes from its ability to scale these algorithms over billions of file blocks.

Supercomputing applications rely on copying data from shared storage into memory, execute algorithms based on data in memory, and write back results onto storage. Most supercomputing applications require terabytes of data to be copied in and out over thousands of CPU cores across hundreds of compute nodes. SV disk provides API's for applications to request data to be prefetched (or scheduled) from filesystems ahead of their use during execution. The application schedulers for supercomputers are responsible for queueing applications to run on a compute node one after the other. The schedulers can be modified to signal the applications in the run queue to invoke the the present storage virtualization system API's to schedule data ahead of execution so that data will already have been in memory when the next program is ready for execution. Similarly, an application that completed execution does not require to wait to write data back to disk. This can be handled asynchronously by the present storage virtualization system.

Figure 17:
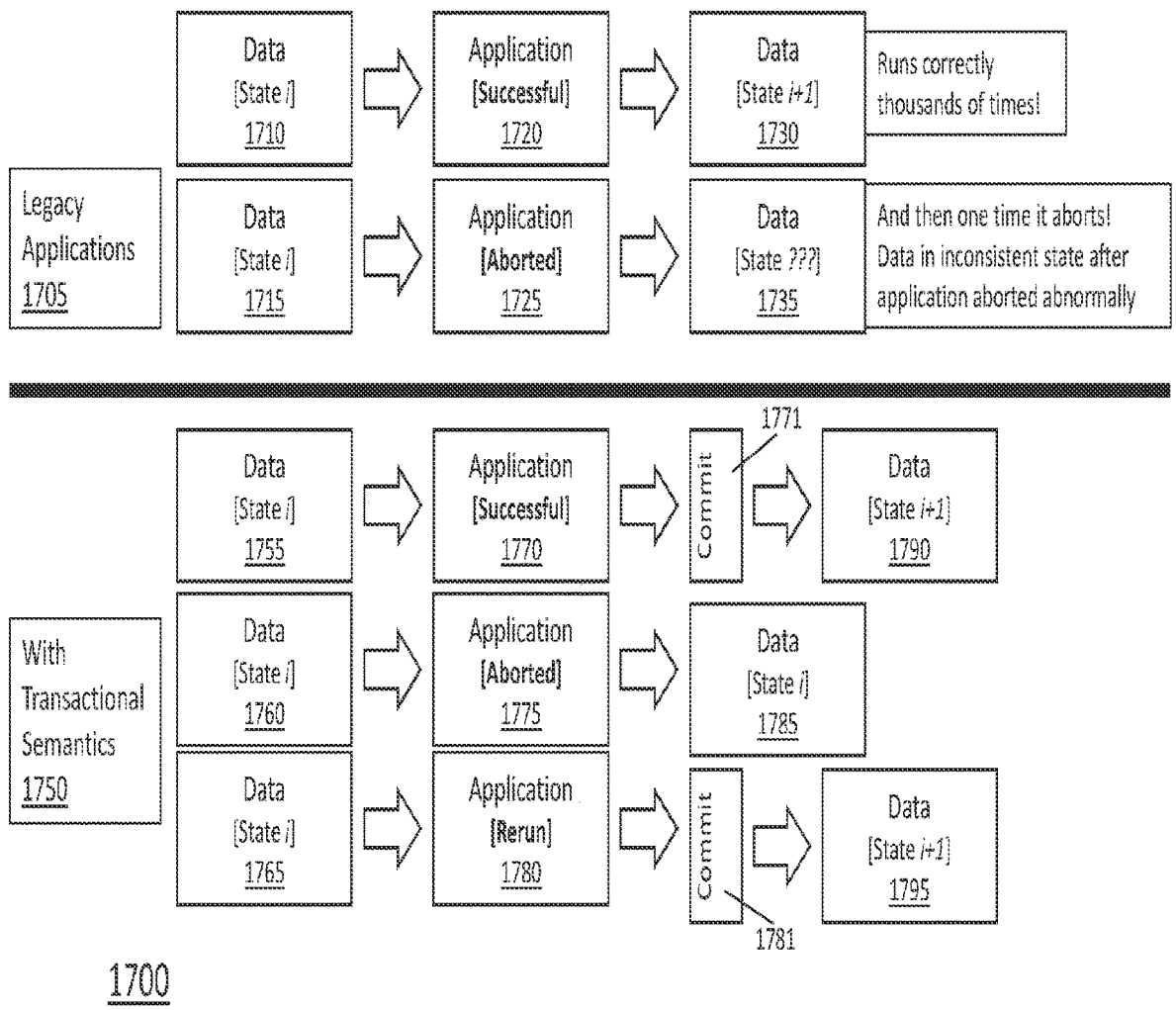
FIG. 17 illustrates exemplary transactional storage semantics in storage virtualization system, according to one embodiment.

FIG. 17 illustrates exemplary transactional storage semantics 1700 in a storage virtualization system, according to one embodiment. In one embodiment, the present storage virtualization system performs transactional storage management. The storage virtualization filesystem may optionally mount a partition as "transactional" in which case the modifications in T0 and T1 caches are written back to T2 storage only if the user specified an explicit "commit" 1771, 1781 of the partition. Thus, if an application aborted midstream or the server encountered a hardware failure, the user can request an explicit "rollback" to a safe point where the data was consistent for the application semantics. The goal is to ensure that data in T2 storage is always consistent with respect to application semantics. If the execution of an application takes the data from state i to state (I+1), in the event of a failure the data "rolls back" to the original sane state I, or in the event of success the data at state (i+1) is committed. In the present storage virtualization system, this transactional semantics is managed by the memory manager of the storage virtualization disk and hence the transactional semantics can persist across reboots, and across compute nodes, and across multiple operating systems.

Transactional storage semantics can be implemented in hardware, software, or firmware of the storage virtualization disk. The management of the transactional storage semantics in the present storage virtualization disk is agnostic of the storage device hardware and type, block device architectures, file system architectures, object store architectures, distributed data store architectures, and other storage management aspects of operating systems. The administrator can also specify at mount time that a partition is mounted "transactionally" with speculative auto-commits where the data is frequently written to T2 storage—but a journal is maintained with the original value of the data blocks by the memory manager to force a "rollback" in the event of abnormal termination of programs or the server encountering a hardware failure. This speculative auto-commit significantly reduces the time for the final "commit" operation if the transaction completed successfully. Transactional storage semantics may be implemented at multiple granularities including but not limited to the following. In one embodiment, transactional storage semantics can apply atomically to data in multiple partitions simultaneously. In another embodiment, the present storage virtualization system provides API's to limit transactional storage semantics to a group of files—all of which can be atomically committed.

The "commit" and "rollback" operations in the present storage virtualization system transactional storage semantics may be performed in multiple ways including but not limited to the following. In one embodiment, the user runs a command with the name of one or more mounted partition(s) to perform the "commit" or "rollback" operation. In another embodiment, the user invokes an API call provided by the present storage virtualization system from inside an application to programmatically perform the commit or rollback of a partition, a group of partitions, a group of files, etc.

Figure 18:
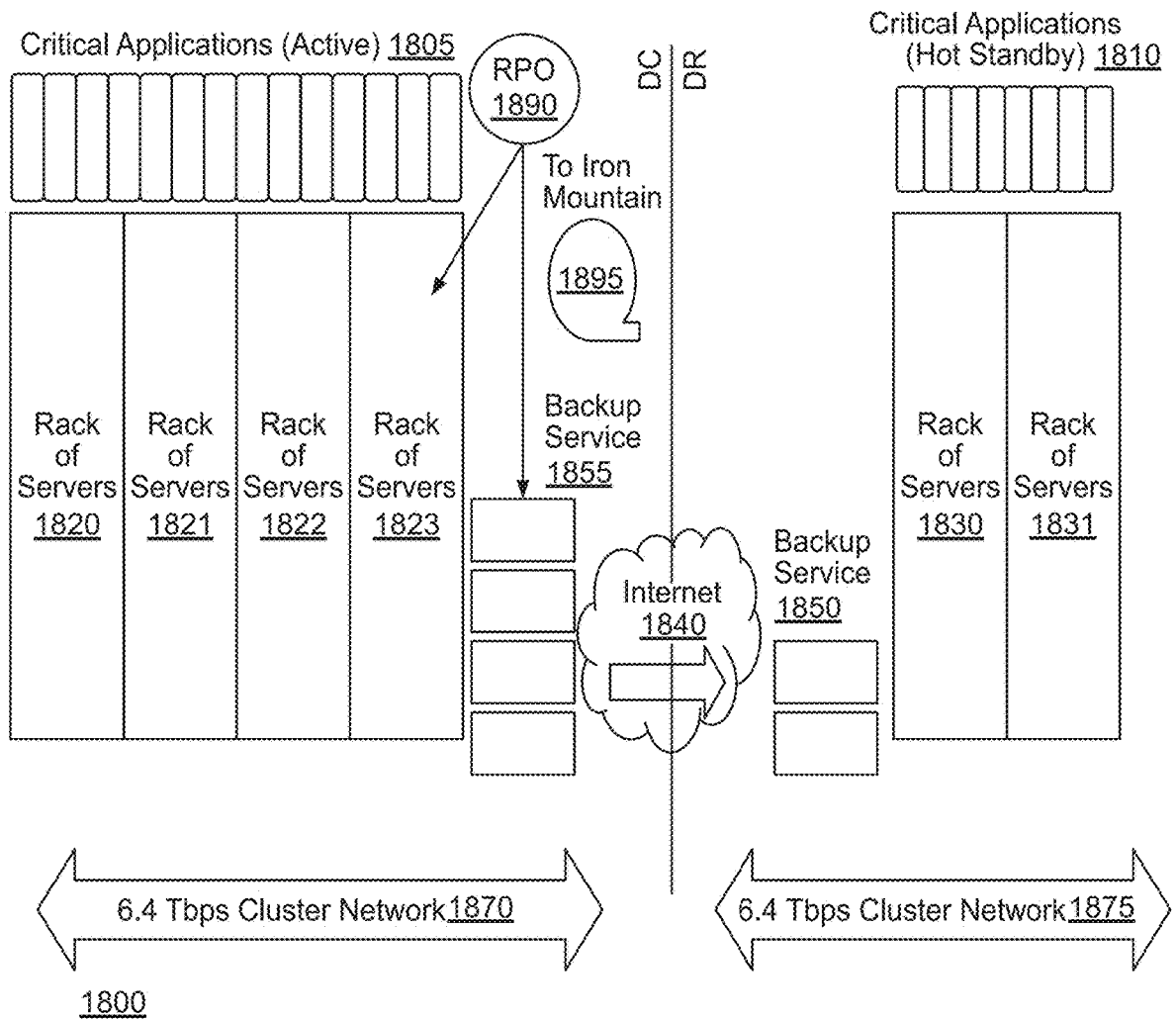
FIG. 18 illustrates an exemplary storage virtualization system 1800 that provides real time or near real time disaster recovery, according to one embodiment.

FIG. 18 illustrates an exemplary storage virtualization system 1800 that provides real time or near real time disaster recovery, according to one embodiment. The hardest problem in backup and disaster recovery is to detect the files or blocks that have changed since the last backup—traditional approaches use applications or services to scour through disks and maintain extensive metadata to remember disk blocks or files that have recently been modified. In the present storage virtualization system, the memory manager maintains a special list of dirty blocks in the T0 and T1 caches to be used exclusively for disaster recovery. The list may be all blocks that have been modified since the last backup operation. The administrator sets specific recovery point objectives (RPO) 1890 which specify the time tolerance to losing data. For example in a Class 1 disaster recovery, the data is transferred to a disaster recovery site 1895 at least once a week, in Class 1 this time period is one day, in Class 2 this time period is around 15 minutes, and in Class 4 this time period is around 1 minute. As explained above, the cost of harvesting the list of modified blocks or files is low with the present storage virtualization system disaster recovery mechanism that it becomes possible for RPO to be as less as a second or less, making it possible to have real time or near real time disaster recovery.

A system timer signals a backup operation at the specific time interval and a backup service 1855 is triggered which works with the memory manager to pack only the modified metadata and data blocks and quickly transfers them first to a bank of local backup servers, and then to the disaster recovery site 1850. This is in contrast with prior disaster recovery operations which require special applications (like Symantec) to be run in each virtual and physical server to perform the backup and data transfer to the disaster recovery site at an application tier. In the present storage virtualization system, the backup and data transfer to the disaster recovery site is managed by the hardware, software, or firmware implementation of the storage virtualization disk. The management of the disaster recovery in the present storage virtualization disk is agnostic of the storage device hardware and type, block device architectures, file system architectures, object store architectures, distributed data store architectures, and other storage management aspects of operation systems.

While the present disclosure has been described in terms of particular embodiments and applications, summarized form, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the scope of the present disclosure.

What is claimed is:

1. A method, comprising:
providing a first storage device having a first Tier 1 cache and a first Tier 2 storage, the first Tier 1 cache and the first Tier 2 storage shared on a first logical partition of the first storage device, wherein the first Tier 1 cache and the first Tier 2 storage are included within a common hardware platform;
providing a first operating system;
providing a first file system having a first virtual Tier 0 memory cache that stores first application data, the first file system managing data transfers between the first virtual Tier 0 memory cache, the first Tier 1 cache and the first Tier 2 storage for the first logical partition; and
synchronizing, using the first virtual Tier 0 memory cache, the first application data with the first Tier 1 cache and the first Tier 2 storage via the first logical partition, wherein the synchronization is performed within the common hardware platform.

2. The method of claim 1, further comprising:
providing a second storage device having a second Tier 1 cache and a second Tier 2 storage;
providing a second operating system;
providing a second file system having the second virtual Tier 0 memory cache that stores the first application data; and
synchronizing, using the second virtual Tier 0 memory cache, the first application data with the second Tier 1 cache and the second Tier 2 storage.

3. The method of claim 1, further comprising:
providing a second storage device having a second Tier 1 cache and a second Tier 2 storage;
providing a second operating system;
providing a second file system having a second virtual Tier 0 memory cache that stores second application data; and synchronizing, using the second virtual Tier 0 memory cache, the second application data with the first Tier 1 cache, the first Tier 2 storage, the second Tier 1 cache, and the second Tier 2 storage.

4. The method of claim 1, further comprising:
providing a second storage device having a second Tier 1 cache and a second Tier 2 storage;
providing a second operating system;
storing a second application data using a second file system having the second virtual Tier 0 memory cache; and
synchronizing, using the first virtual Tier 0 memory cache, the first application data with the first Tier 1 cache, the first Tier 2 storage, second Tier 1 cache, and the second Tier 2 storage.

5. The method of claim 1, further comprising deduplicating a file store, where deduplication happens at a block level.

6. The method of claim 1, further comprising deduplicating a file store, where deduplication happens at a file level.

7. The method of claim 1, further comprising interconnecting the first Tier 1 cache with one or more compute nodes using a high speed network.

8. The method of claim 1, further comprising interconnecting the first Tier 2 storage with one or more compute nodes using a low speed network.

9. The method of claim 1, further comprising:
providing a first hypervisor running on the first operating system; and
providing one or more first virtual machines running on the hypervisor, a first virtual machine of the one or more first virtual machines having the first virtual Tier 0 cache.

10. The method of claim 1, wherein the first Tier 1 memory cache is a solid state drive.

11. The method of claim 1, wherein the first Tier 2 memory cache is a hard disk drive.

12. The method of claim 1, further comprising a multi-boot module.

13. The method of claim 1, wherein the first file system comprises:
a memory manager; and
an input output handler having threads, a Tier 1 storage mount and a Tier 2 storage mount.

14. The method of claim 1, further comprising:
providing a second file system having a second virtual Tier 0 memory cache that stores second application data; and
synchronizing the second application data with the second virtual Tier 0 memory cache using the first file system having an additional first Tier 0 virtual memory cache.

15. The method of claim 1, further comprising synchronizing a second application data through the first Tier 1 cache using an additional first Tier 0 virtual memory cache.

16. The method of claim 1, further comprising synchronizing the first application data through the first Tier 1 cache, using an additional second Tier 0 virtual memory cache.

17. The method of claim 16, wherein the first Tier 1 cache includes, metadata, a T0 read cache, a T0 write cache and a T1 read write cache for the first application data.

18. The method of claim 17, further comprising synchronizing the metadata, the T0 read cache, and the T0 write cache using the first Tier 0 virtual memory cache.

19. The method of claim 17, further comprising synchronizing the metadata, the T0 read cache, and the T0 write cache using the additional second Tier 0 virtual memory cache.

20. A system, comprising:
- a first storage device having a first Tier 1 cache and a first Tier 2 storage, the first Tier 1 cache and the first Tier 2 storage shared on a first logical partition of the first storage device, wherein the first Tier 1 cache and the first Tier 2 storage are included within a common hardware platform;
- a first operating system;
- a first file system having a first virtual Tier 0 memory cache that stores first application data, the first file system managing data transfers between the first virtual Tier 0 memory cache, the first Tier 1 cache and the first Tier 2 storage for the first logical partition; and
- wherein the first virtual Tier 0 memory cache synchronizes the first application data with the first Tier 1 cache and the first Tier 2 storage via the first logical partition, and wherein the synchronization is performed within the common hardware platform.

* * * * *